A- To G- : CALLED NUMBER.

H- To L- : CALLING LINE LOCATION, LINE LINK FRAME.

M-, N- : TRUNK LINK FRAME NO.

O-, P- : LOCATION OF INCOMING TRUNK ON T.L.F.

INC : INDICATE INCOMING CALL

United States Patent Office 3,509,283
Patented Apr. 28, 1970

1

3,509,283
LINE DETECTOR CIRCUIT
Pierre A. Deschenes, Sherbrooke, Quebec, and Gunars Balgalvis and William N. Regan, Ottawa, Ontario, Canada, assignors to Northern Electric Company Limited, Montreal, Quebec, Canada
Filed Dec. 27, 1965, Ser. No. 516,492
Int. Cl. H04q 3/72
U.S. Cl. 179—18
16 Claims

ABSTRACT OF THE DISCLOSURE

A system for identifying telephone calls to preselected numbers that are prone to receive malicious calls, a call to such a preselected number actuating means for recording information about the calling number.

Figure 1:
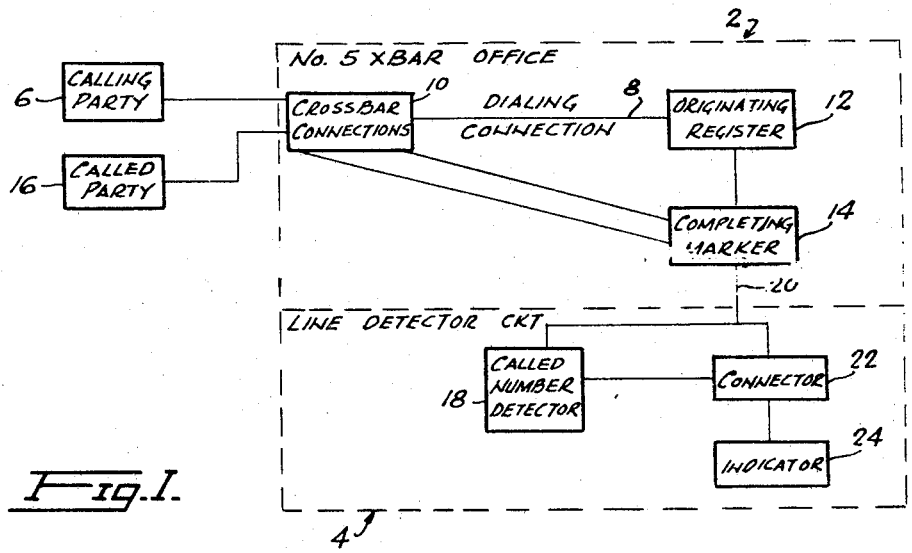

This invention relates to a line detector device for identifying a calling line in the event of a telephone call directed to a preselected called number. More specifically, the invention is concerned with the identification of a calling party in a common control telephone system, such as the well known No. 5 X Bar system.

Occasionally, for various reasons, it is desirable to determine the origin of a telephone call, i.e. to trace the call back to the calling party. Calls which are desired to be traced are hereinafter referred to as malicious calls. Obviously, all calls to a preselected number will not, in fact, be malicious, although they will all be suspect, or "potentially malicious." For the purposes of description of the apparatus herein disclosed, which apparatus itself can make no distinction between potentially malicious and actually malicious calls, all calls to preselected called number are referred to herein as "malicious," as a convenient label to apply to calls that it is desired to trace. In the past, in step-by-step telephone systems, malicious calls have commonly been traced by preventing the release of an annoying connection. However, in common control systems employing crossbar type switches, this approach is impractical. A more suitable method for tracing malicious calls in a common control switching system is disclosed in Smits U.S. Patent 2,913,526 issued Nov. 17, 1959 to the American Telephone and Telegraph company. In the system disclosed in this patent, a detecting circuit is connected to the completing marker the detecting circuit being cross-connected to operate when the marker is handling a call for the particular called subscriber to whose line calls are to be traced. When a call is made to such subscriber, the detector circuit blocks the progress of the call through the completing marker which is processing the call, i.e. it causes a "trouble" in such completing marker. A trouble recorder is then actuated to print out a record of the trouble, including a record of the called and calling numbers, and the call is rerouted to another completing marker for completion.

A major disadvantage of this system is that it requires the use of two completing markers, one marker being tied up for a brief interval because of the "trouble" produced in it, and the second marker being used to process the call. During this time the two markers are unavailable for other duties, and this is undesirable in a small office. In addition, the system in the Smits patent requires that the office contain a trouble recorder and master test frame for providing a printed record of the called and calling numbers, and it is economically impractical to place such equipment (which is highly expensive) in small offices.

Accordingly, it is an object of the present invention to provide a system for tracing malicious calls to preselected called parties, which system requires the use of only one completing marker (that normally used to complete the

2 call) instead of two, and which system does not interfere with the operation of the completing marker. Further objects and advantages of the present invention will appear from the following disclosure, in which the embodiment discussed is presented for illustrative purposes, the broad scope of the invention being defined primarily by the appended claims.

Figure 2:
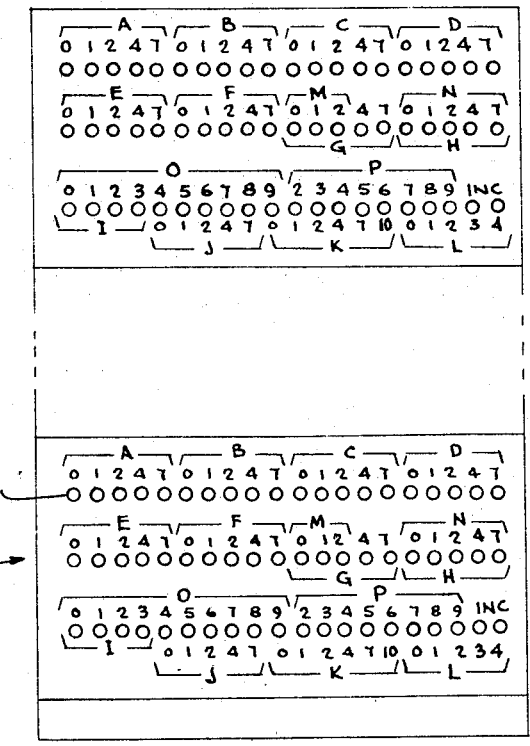
Figure 3:
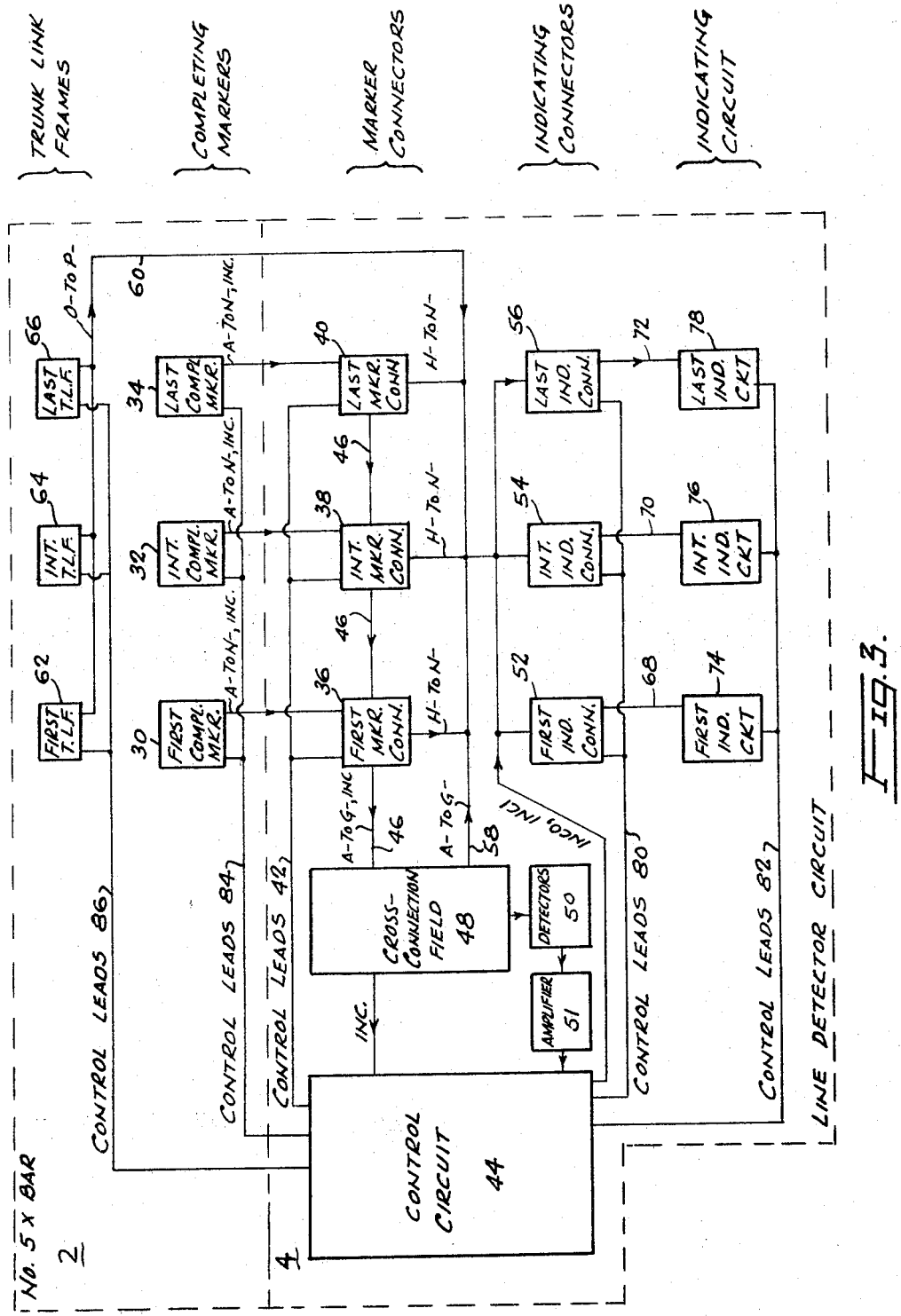
Figure 4:
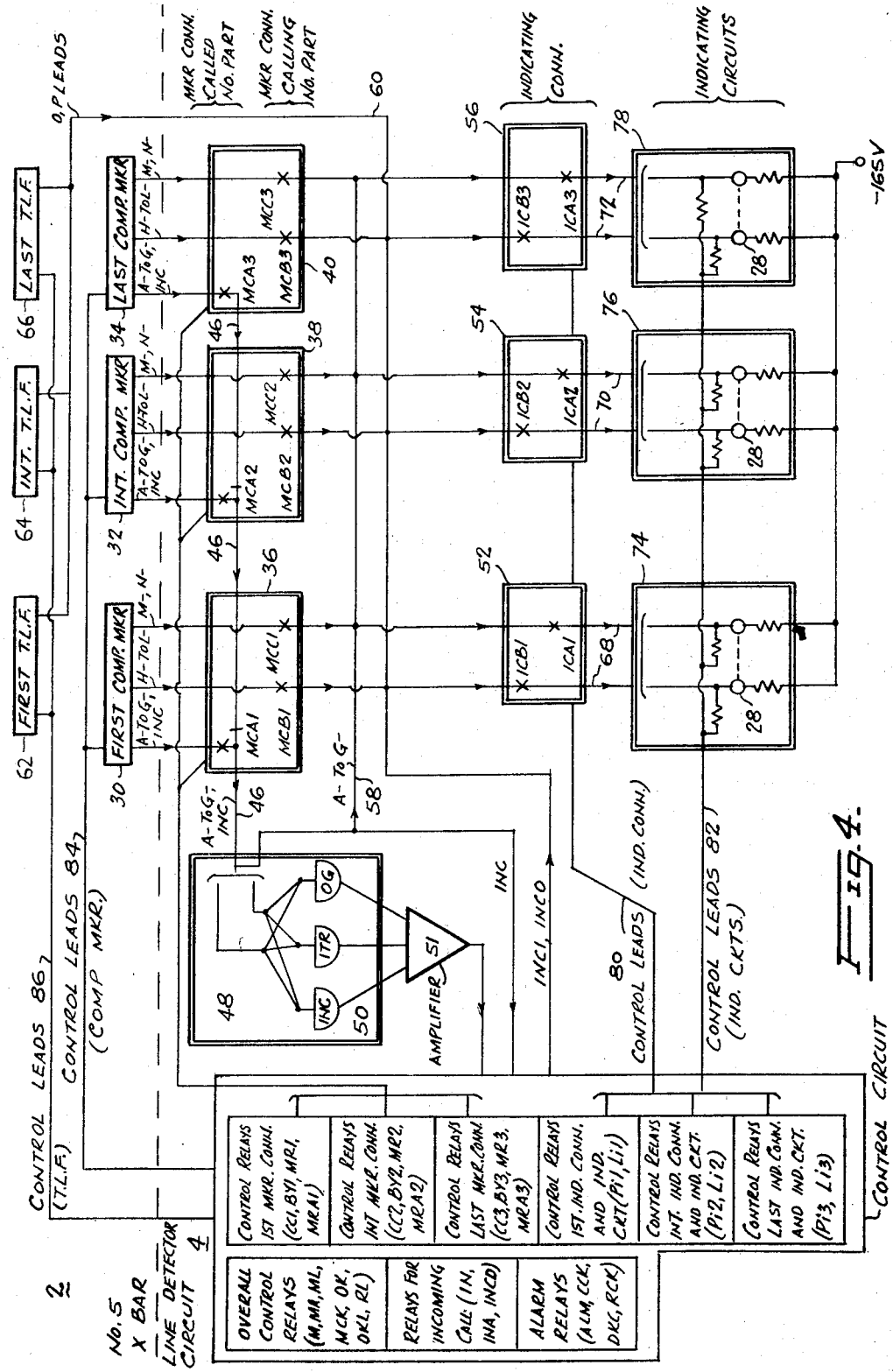
Figure 5:
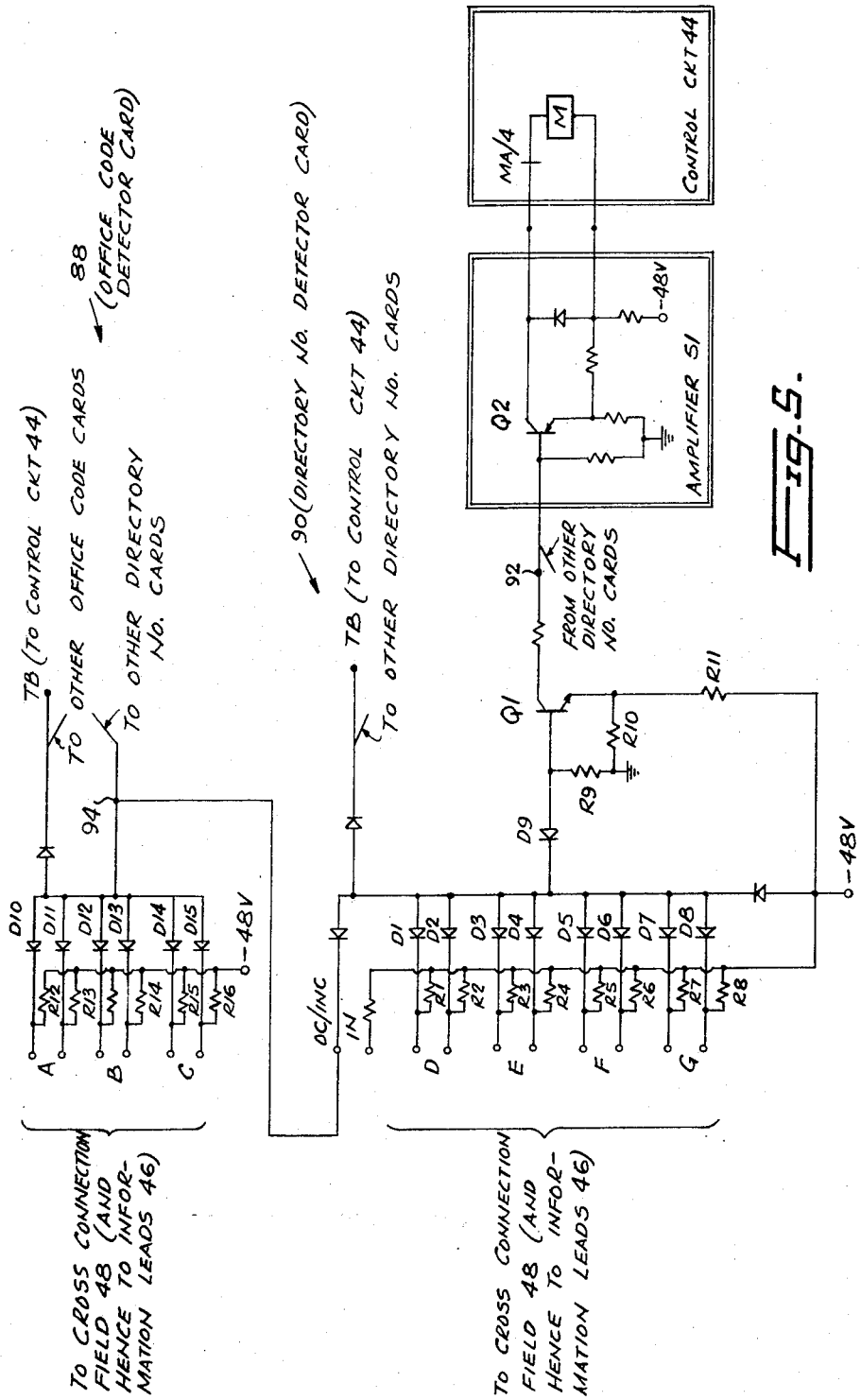
Figure 6:
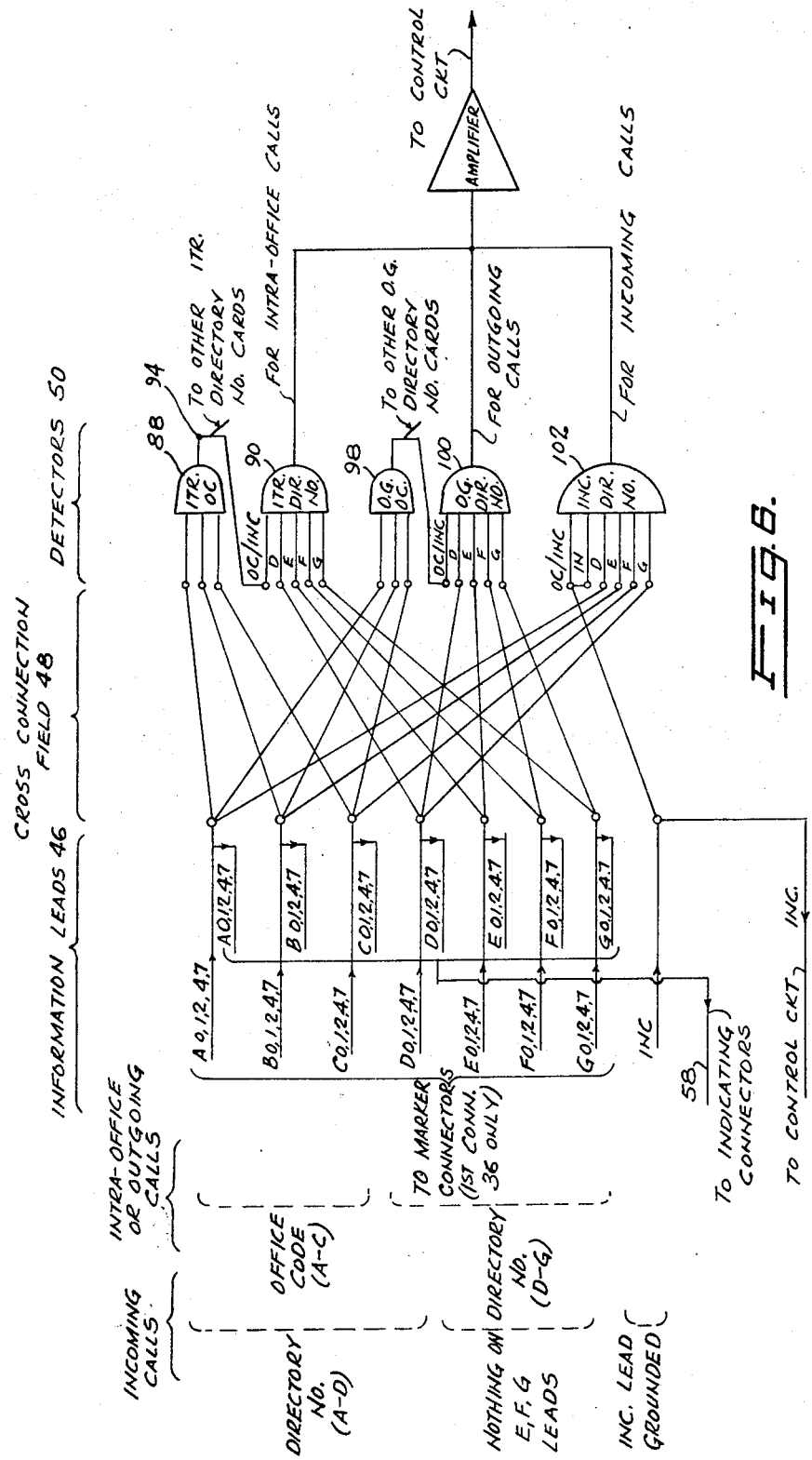
Figure 7:
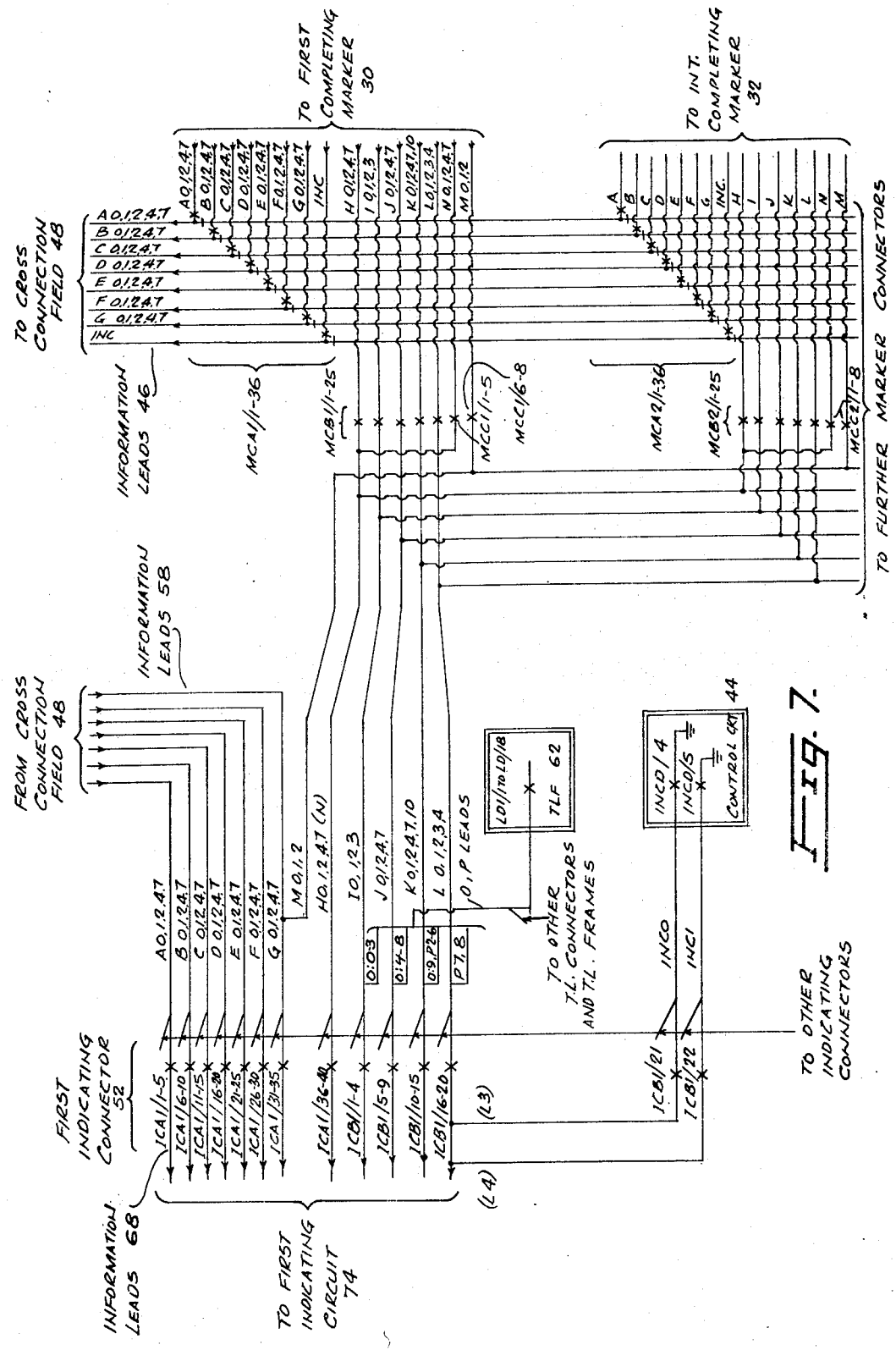
Figure 8:
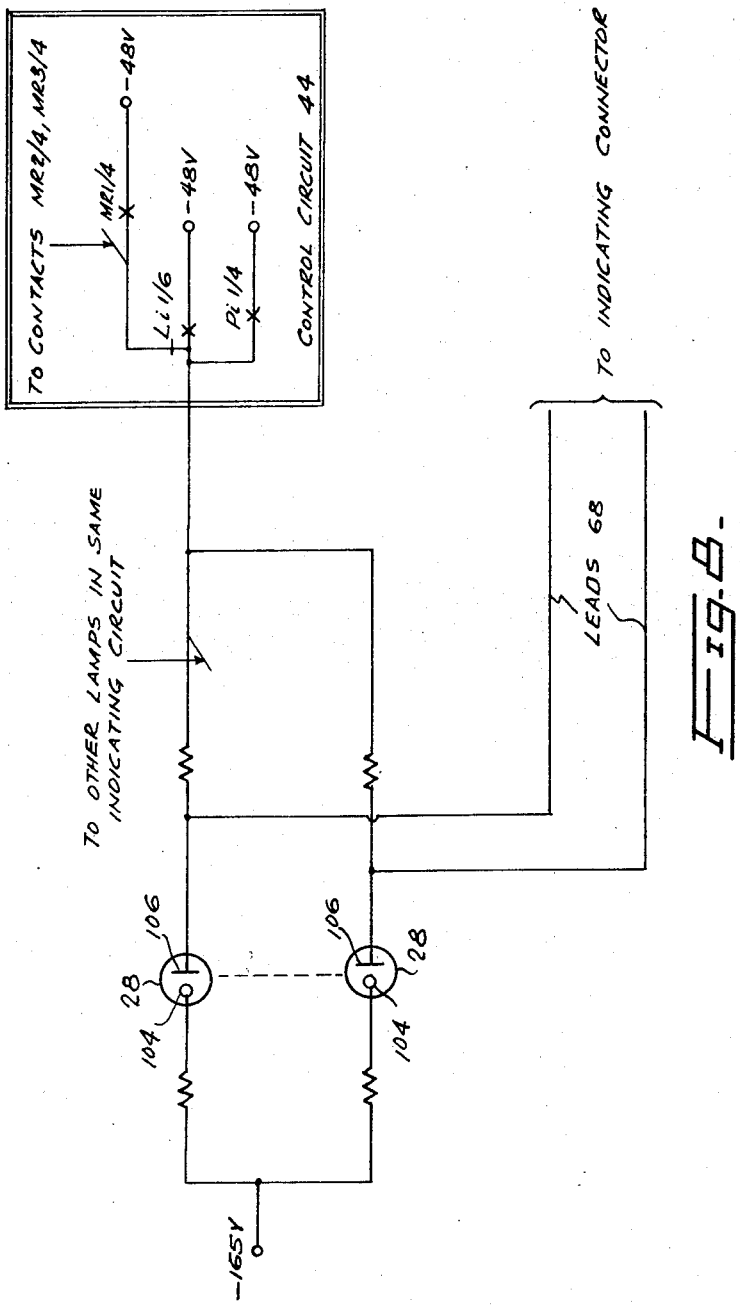
Figure 9:
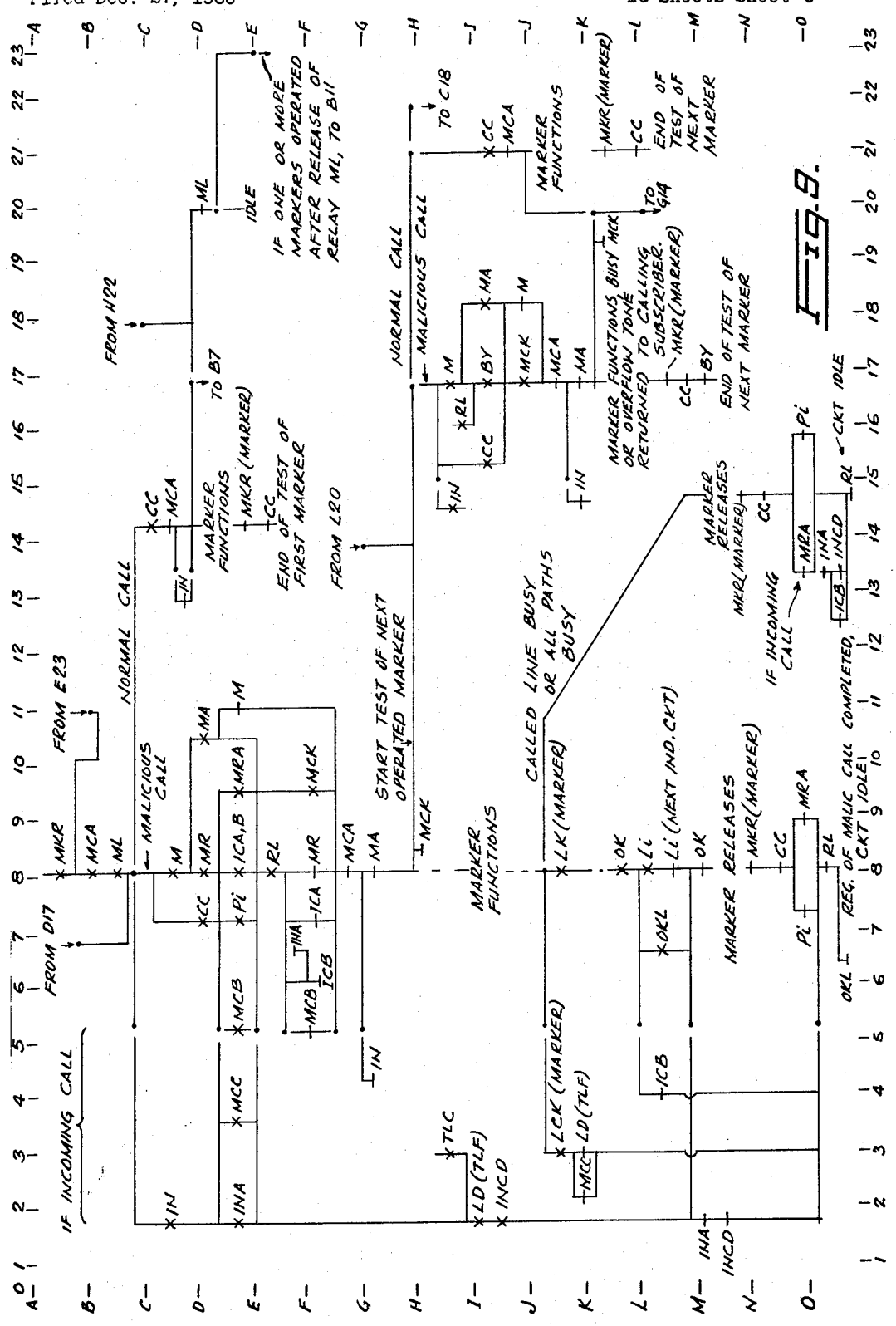
Figure 10:
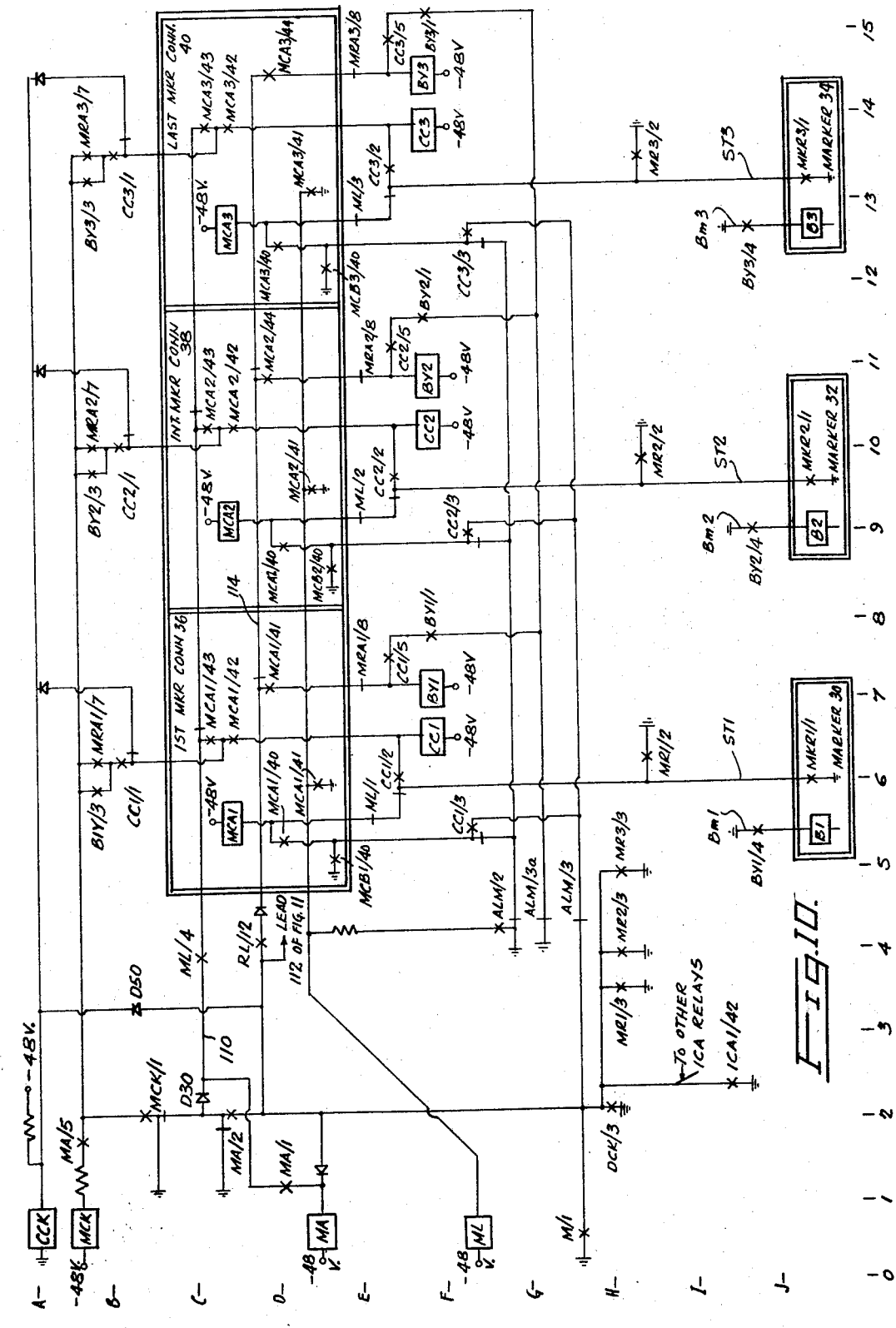
Figure 11:
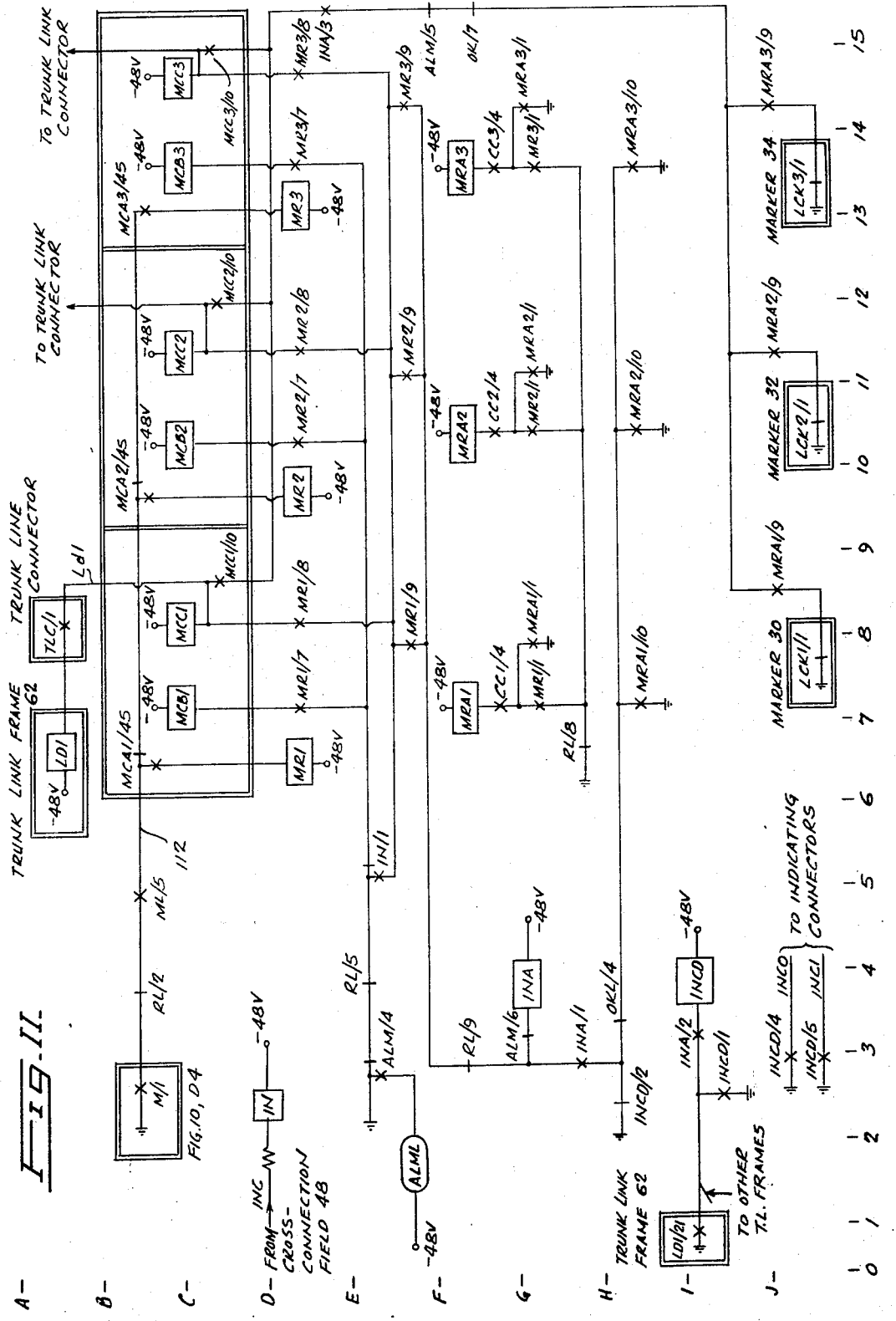
Figure 12:
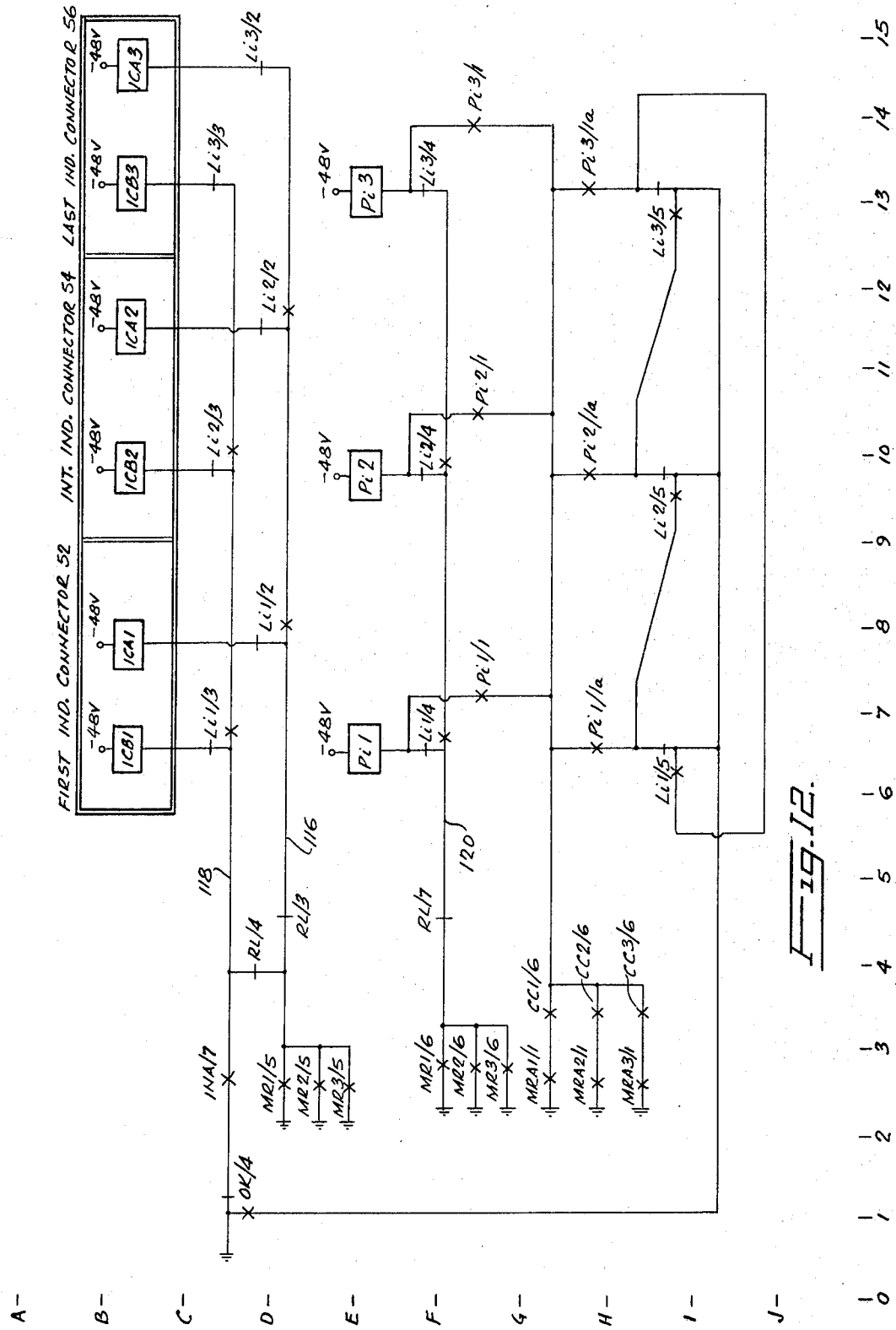
Figure 13:
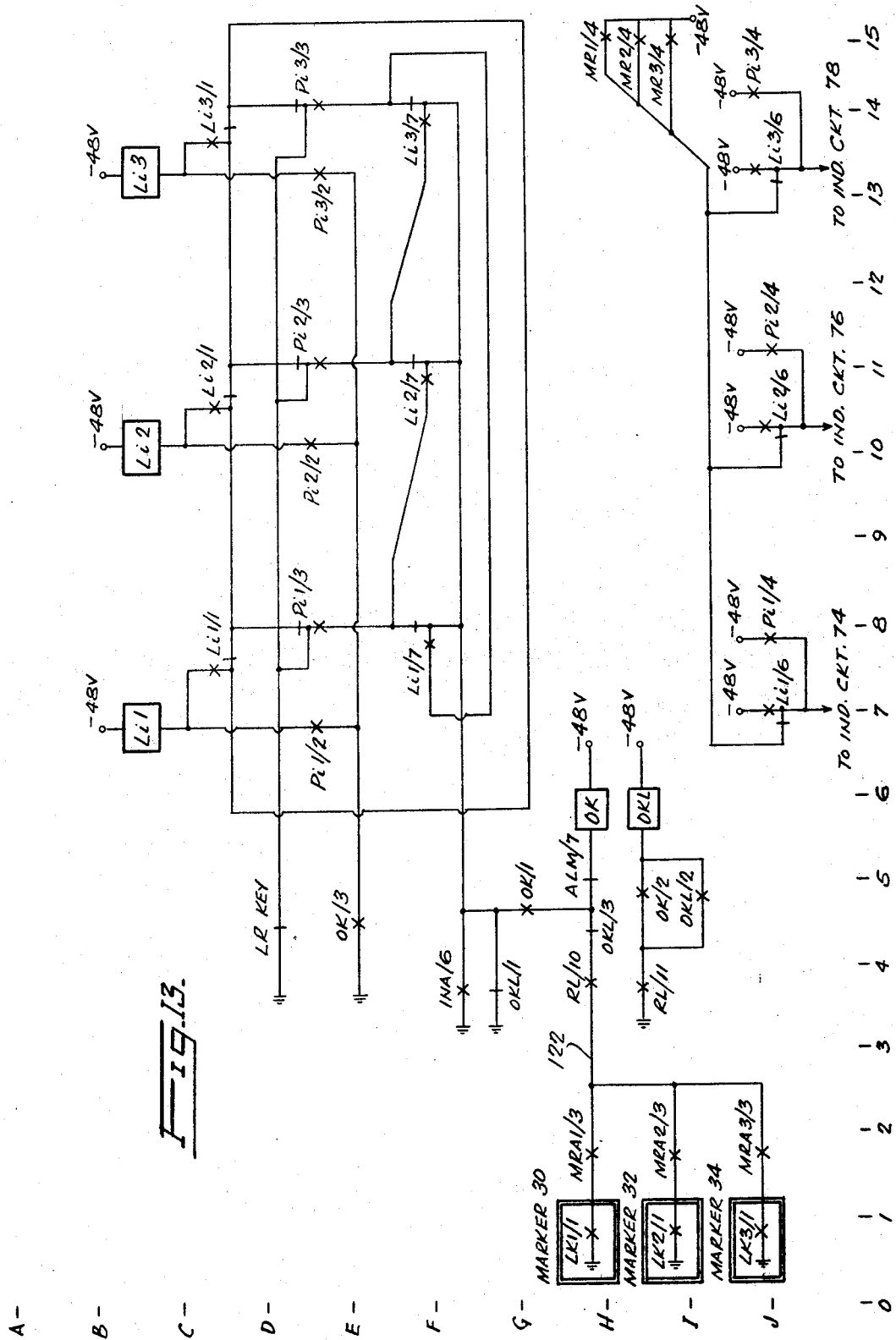
Figure 14:
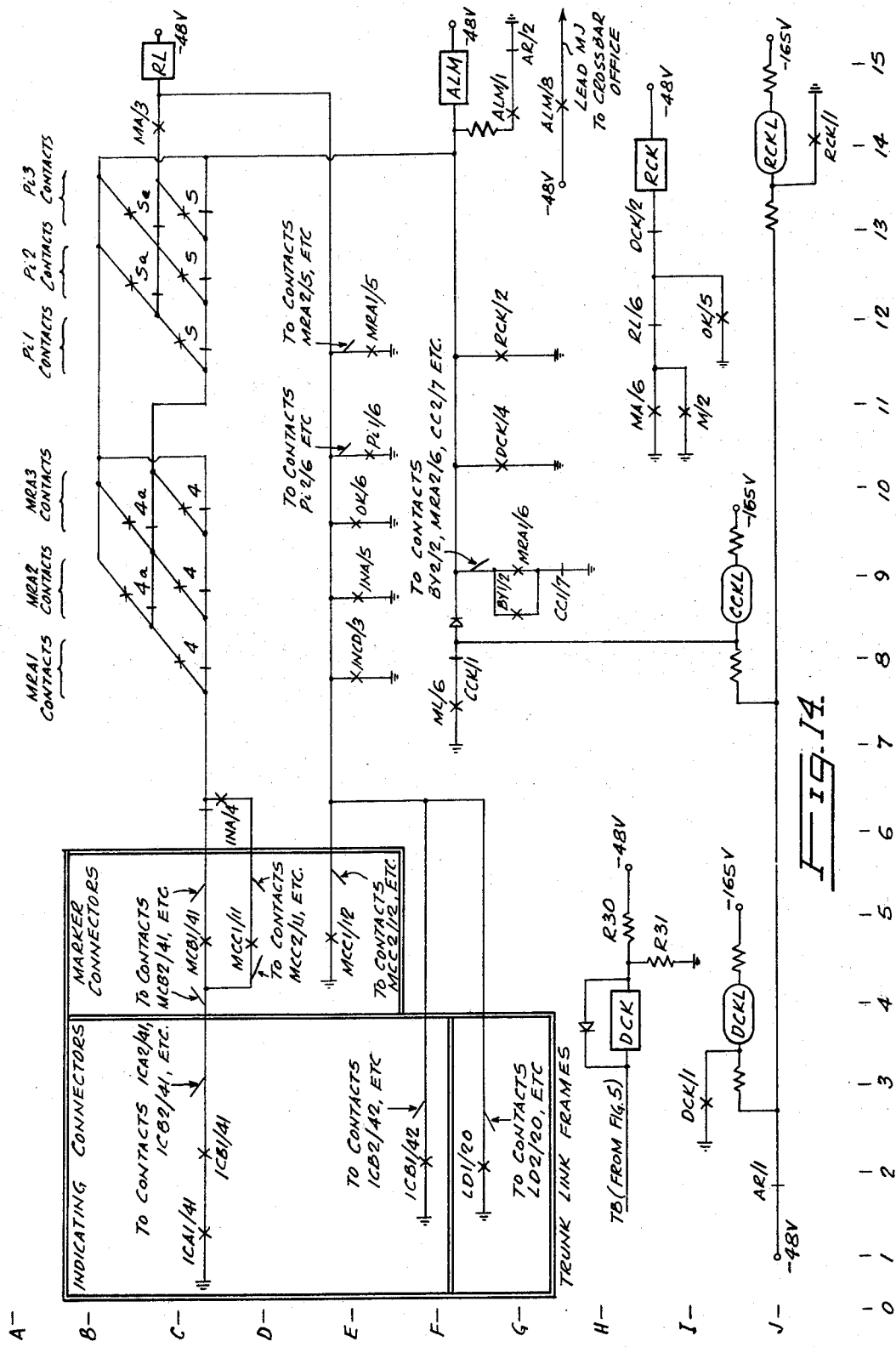
Figure 15:
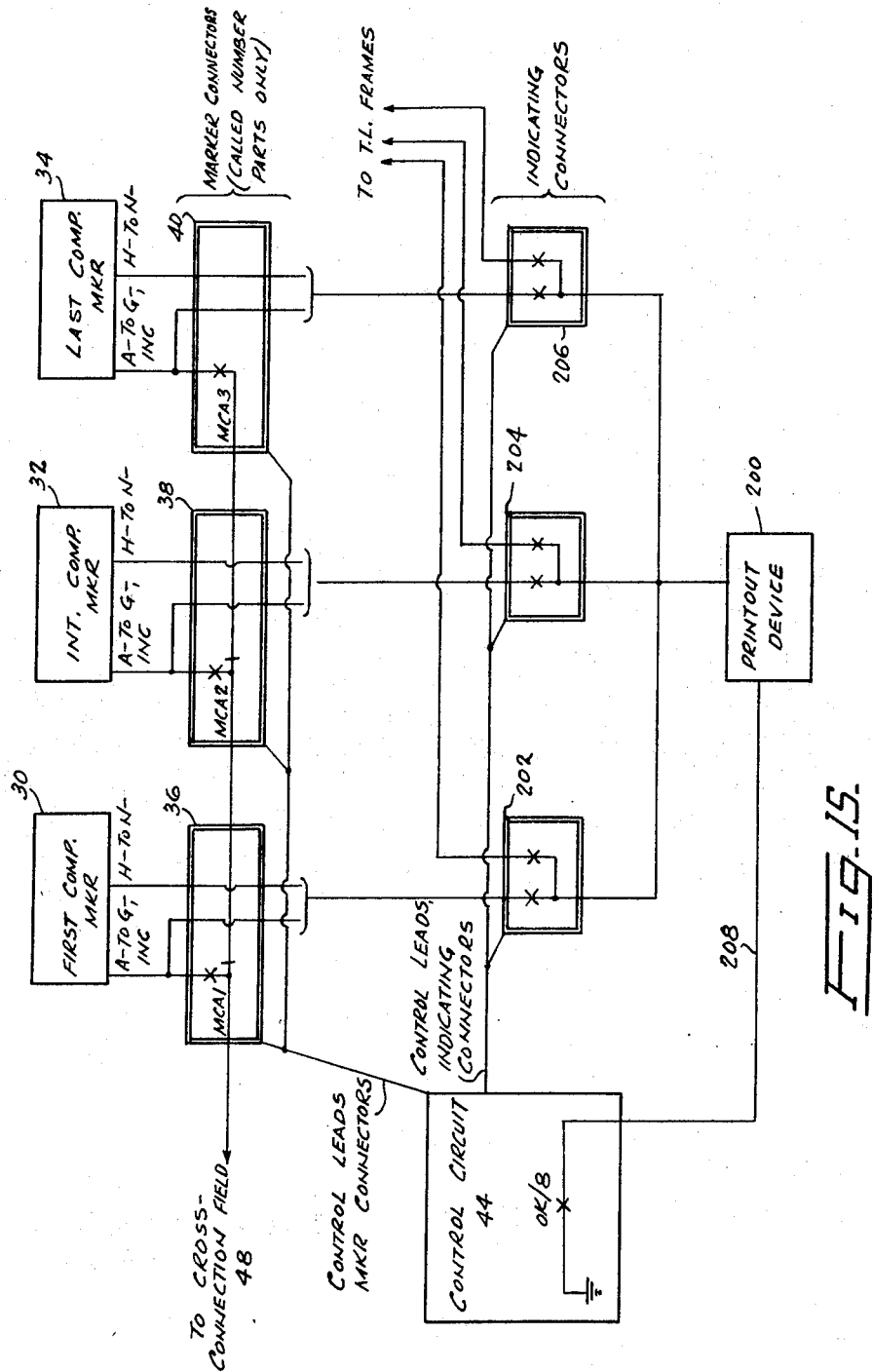
Figure 16:
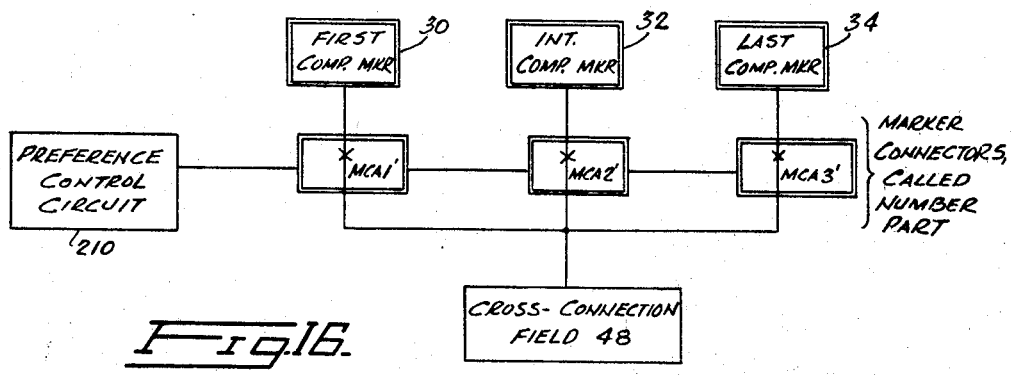
Figure 17:
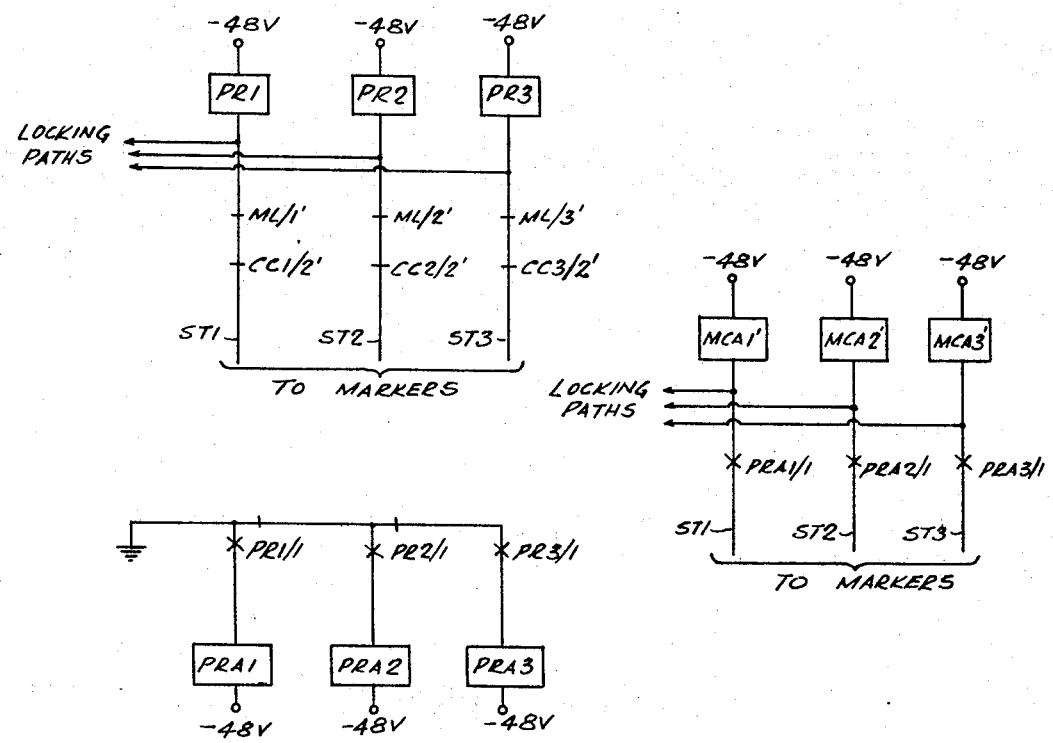
Figure 19:
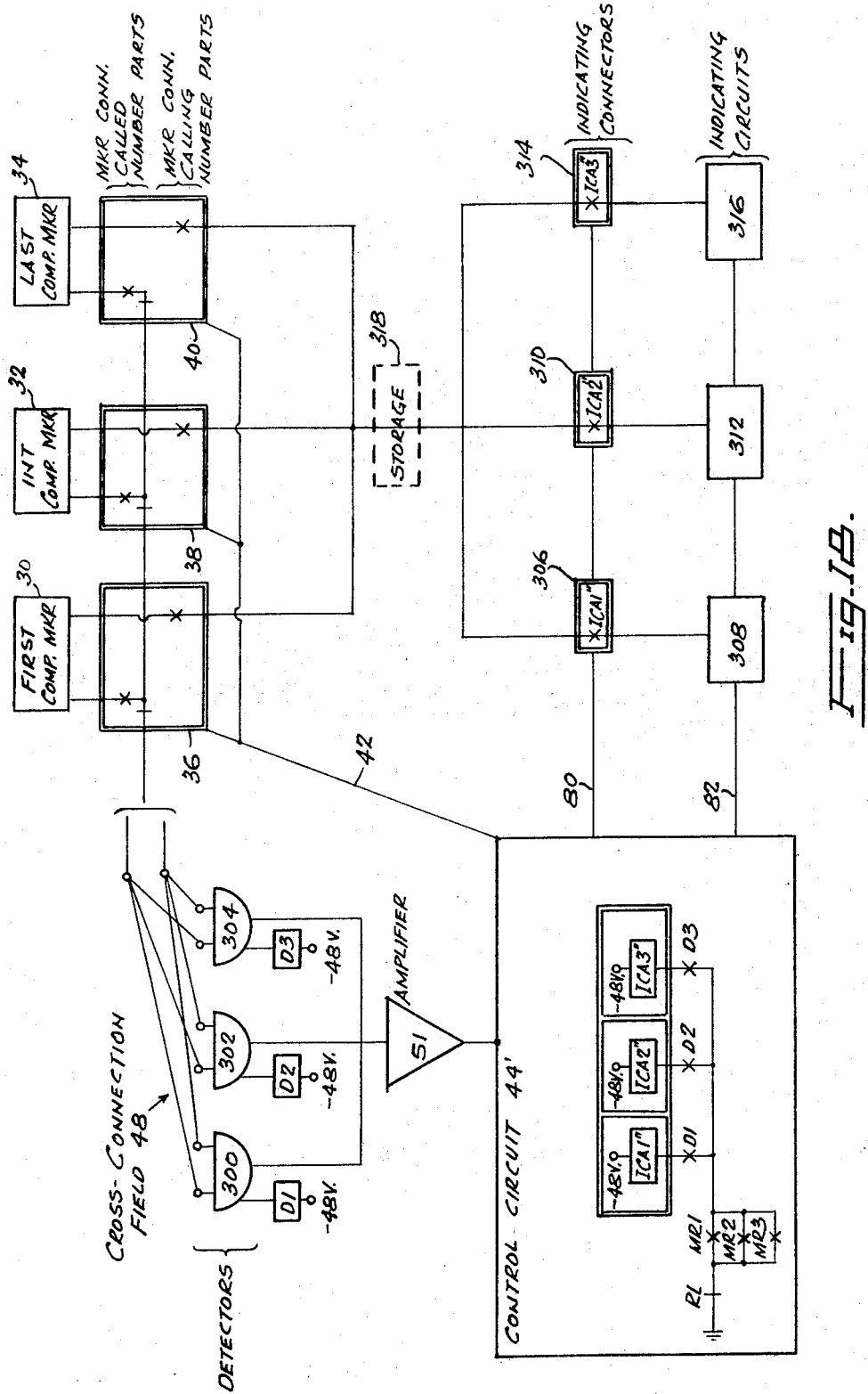

In the drawings:
FIGURE 1 is a simplified block diagram illustrating aspects of the present invention;
FIGURE 2 shows typical lamp display indicators used to display information of a calling number and a calling line;
FIGURE 3 is an expanded block diagram for the line detector circuit of the invention;
FIGURE 4 is a block diagram similar to that of FIGURE 3 but illustrating in more detail certain aspects of the control and information leads and relays;
FIGURE 5 illustrates typical detector circuits or cards for use with the invention, together with an amplifier and malicious call recording relay;
FIGURE 6 illustrates typical cross-connections in the detector cross-connection field;
FIGURE 7 shows information lead connections interconnecting the markers, marker connectors, cross-connection field, indicating connectors, and indicating circuits;
FIGURE 8 shows the control wiring for an indicating circuit;
FIGURE 9 is a sequence chart illustrating the sequence of relay operations and releases;
FIGURE 10 shows the marker connector called number part relays and that part of the control circuit particularly concerned with their operation;
FIGURE 11 shows the marker connector calling number part relays and that portion of the control circuit particularly concerned with their operation, and also the incoming call relays;
FIGURES 12 and 13 shows the indicating connector relays, and a further portion of the control circuit including the control relays for the indicating circuits and connectors;
FIGURE 14 shows the alarm and release portions of the control circuit;
FIGURE 15 shows a modification of the indicating connector arrangement;
FIGURE 16 shows a modification of the marker connector arrangement;
FIGURE 17 shows control means for the marker connector arrangement of FIGURE 16; and
FIGURE 18 shows another embodiment of the invention.

INTRODUCTION

Reference is first made to FIGURE 1, which shows in simplified block diagram form parts of a crossbar office 2, as combined with a line detector circuit 4 of the present invention. In a crossbar switching system, when a calling party 6 lifts his telephone receiver, a dialling connection 8 is established through connections 10 in the crossbar office, to an originating register 12. Register 12 supplies the calling party 6 with dial tone informing him that he may dial and also stores information concerning the equipment location of his line on a line link frame in the office. The calling party 6 then dials and the dialled number is stored in the register 12. After dialling is completed, the register 12 passes its information on to a completing marker 14 which as this point stores (in digit register relays, not shown) the calling number equipment location and the called number. The marker next obtains the equipment location of the called number, and then establishes a connection through the connections 10 between the calling party 6 and the called party 16.

In the line detector circuit 4, a called number detector 18 is provided. If a party is being bothered by malicious calls, he notifies the telephone company, which cross-connects such a detector to the marker 14 (i.e to the digit register relays of the marker) over information leads 20. When the marker receives the called number from the register, the potentials representing the called number are at the same time passed over certain of the information leads 20 to the detector 18, which thus in effect operates in parallel with the marker. The detector 18 is connected to provide an output when the bothered party's number is dialled, but not when any other number is dialled.

When a detector output occurs (indicating a malicious call) this output actuates a connector 22 which connects the information leads 20 from the completing marker 14 to an indicator 24, which may be a lamp bank, a tape punch device, a printout device, etc. The potentials from the digit register relays (not shown) in marker 14, besides being used to complete the call, are thus transferred in addition to the indicator 24 where they provide a record of the called number and of the calling number equipment location. The indicator 24 thus constitutes indicating means for receiving and recording information of the called number and of the calling line. From this latter, the number of the calling party can be obtained, by use of the crossbar office records.

In the detailed embodiment to be described, the indicator 24 includes a number of lamp displays 26 (FIGURE 2) to display information as to the called number and calling line upon registration of a malicious call. The display 26 includes a number of lamps 28 (sixty in number) divided into groupings A to P and INC, of which groupings M to P and INC are alternatives to groupings G to L. If the call being recorded is a call incoming into the office 2 from another office, the two lamps INC light, indicating that the call is incoming and that groupings M to P are to be read instead of groupings G to L. If none or only one of the INC lamps is lit, the call being recorded originates from the office 2 with the line detector circuit 4 is associated, and groupings G to L are to be used.

Assume that the call being recorded originates from the office 2, i.e. is an intra office or an outgoing call, and not an incoming call. Then lamp groupings A to C indicate the called number office code digits (in the usual 2 out of 5 code); groupings D to G indicate the called number directory digits and groupings H to L indicate the calling line location on the line link frames. (From the information displayed in groups H to L, the calling number is ascertained with the aid of the office records.)

Assume that the call being recorded originates from an office other than the office 2, i.e. is an incoming call. In that event, both INC lamps light, indicating (a) that groupings M to P are to be read instead of groupings G to L, and (b) that the called number directory digits are displayed in the A to D groups. Then the information displayed in indicator display 26 will be: groups A to D—the called number directory digits; groups E and F—nothing (no information is usually received from the marker or displayed as to the called number office code digits, in an incoming call); groups M and N—incoming trunk link frame number; and groups O, P—location of incoming trunk on that trunk link frame. From the information in the M to P groups, the incoming trunk on which the call comes into the office 2 may be identified thus identifying the office from which the call originated. The calling number in such other office is not identified; a further line detector circuit must be installed in the other office for that purpose.

EXPANDED BLOCK DIAGRAM

Reference is next made to FIGURES 3 and 4, which show, in slightly different ways, an expanded block diagram for the detailed embodiment to be described. FIGURES 3 and 4 are, each like FIGURE 1, divided into a block 2 depicting pertinent portions of a No. 5 crossbar office, and a block 4 depicting the line detector circuit. The No. 5 crossbar office is shown as including first, intermediate, and last completing markers 30, 32, and 34 respectively. The markers are designated as first, intermediate and last because there may be more than three markers in the office; similarly, of course, there may be fewer than three.

Associated with the completing markers 30, 32, 34 are respective marker connectors 36, 38, 40. Control leads 42 extend from the marker connectors to a control circuit 44. The marker connectors each contain (see FIGURE 4) a called number part, i.e. relays MCA1, MCA2, MCA3 respectively, and a calling number part, i.e. relays MCB1, MCC1; MCB2, MCC2; and MCB3, MCC3, respectively. Called number information leads A to G and INC extend from each of the completing markers 30, 32, 34 to the called number parts (i.e. to the contacts of the MCA relays) of their associated marker connectors 36, 38 and 40 respectively. (Each of "leads" A, B, C, etc. contains 5 leads, so that the A to G leads include 35 leads. Lead INC is a single lead.) Called number information leads 46 (designated A to G and INC) extend through the marker connectors (i.e. through the contacts of the MCA relays) to a cross-connection field 48 which is in turn connected to detectors 50 connected through an amplifier 51 to the control circuit 44.

Calling line information leads H to L (calling line location, line link frame) and M, N (calling trunk link frame number) extend from each of the markers to the respective calling number parts of marker connectors 36, 38, 40 (i.e. to relays MCB1, MCC1; MCB2, MCC2; MCB3, MCC3, respectively).

Also provided is a series of indicating connectors 52, 54, 56, having indicating relays ICA1; ICB1; ICA2; ICB2; ICA3, ICB3 respectively (FIGURE 4). The indicating connectors are connected together, so that each can receive information from any marker connector. The calling line information leads H to N from the marker connectors 36, 38, 40 are connected to the indicating connectors 52, 54, 56, as are a set of called number information leads 58 (designated A to G) from the cross connection field. Also extending to the indicating connectors are calling line information leads 60 (designated as O, P; these leads carry information as to trunk location on the trunk link frame) from trunk link frames 62, 64 and 66 in the No. 5 crossbar office, and leads INC0 and INC1 from the control circuit 44.

From the indicating connectors, information leads 68, 70, 72 extend to respective indicating circuits 74, 76, 78, each indicating circuit including a lamp display similar to display 26 of FIGURE 2.

Extending from the control circuit 44 are control leads 80 to the indicating connectors 52, 54, 56; control leads 82 to the indicating circuits 74, 76, 78; control leads 84 to the markers 30, 32, 34; and control leads 86 to the trunk link frames 62, 64, 66.

GENERAL DESCRIPTION OF OPERATION

The general operation of the system of FIGURES 3 and 4 is as follows. If several completing markers in the No. 5 crossbar office 2 are seized for operation, the line detector circuit 4 will lock onto these operated markers and lock itself out from all other completing markers in the office 2. Note that, throughout this specification and its appended claims, the terms "operate," "operated" or "operation," in relation to a marker are used to indicate that the marker has been seized and has commenced to operate. These terms are not intended to imply that the marker has "operated" in the sense of having completed a call. This ensures that any later operated markers will not interfere with the testing (i.e. sampling of the locked-in markers. More specifically, the MCA relays of the marker connectors associated with the operated markers operate. When this occurs, means in the control circuit 44 prevent operation of any further MCA relays until the testing of the now operated markers is completed.

The testing of the locked-in markers is done in sequence, starting with the lowest and ending with the highest numbered operated marker. The called number information leads A to G and INC of the lowest numbered operated marker, e.g. marker 30, are connected by its associated marker connector 36 (through the contacts of relay MCA1) to the cross-connection field 48 and thence to the detector circuits 50 for test as to whether the call is malicious or normal (not malicious). Operation of marker connector 36 prevents information from being transmitted to the cross-connection field by any other operated marker connectors (such as marker connector 38).

If the call is normal, i.e. no output received from the detector 50, the control circuit 44 causes release of the marker connector 36, and the called number information leads A to G, INC of the next operated and locked in marker, e.g. marker 32, are connected by its associated operated marker connector 38 to the cross-connection field and detector circuits for test. In the meanwhile, the control circuit 44 retains in memory the fact that it has checked marker 30, so that this marker will not be checked again so long as it is processing the same call.

If the call being processed by the first marker 30 is malicious (in which case an output is sent into the control circuit 44 by the detectors 50), the control circuit then operates a preferred indicating connector, e.g. indicating connector 52, and its associated indicating circuit 74. The indicating connectors (with their associated indicating circuits) are operated in sequence, as malicious calls are received. As information as to a malicious call is registered in one indicating circuit, e.g. indicating circuit 74, the lamp display in the next indicating circuit, e.g. circuit 76, is erased; information as to the next malicious call is then then stored in indicating circuit 76, and so on in a cyclical sequence.

Actuation of indicating connector 52 causes connection of called number information leads 58 (from the cross-connection field 48) to indicating circuit 74, thus registering the called number in the lamps of that circuit. At the same time, the control circuit 44 operates the calling number part of marker connector 36, i.e. either relay MCB1 (if the call is intra-office or outgoing) or relay MCC1 (if the call is incoming) to register information in the lamps of indicator circuit 74 as to the equipment location of the calling line.

At this time, the information is stored in the indicating circuit 74 only temporarily, until it has been determined whether the call will be completed, i.e. whether the called number or all paths thereto are busy. A period of time, during which the marker 30 attempts to set up a connection between the calling and called parties, now elapses. During this time, the line detector circuit can test other operated and locked-in completing markers to see if they are handling malicious calls, but it cannot register another malicious call. If another malicious call is detected, e.g. in marker 32 while the first malicious call is being processed, the control circuit 44 sends a signal over control leads 84 to marker 32 to cause a "busy" condition in this marker. This causes marker 32 to instruct its associated register to return busy or overflow tone to the calling subscriber, and the marker 32 then releases. In this way, the second malicious call will not be processed undetected.

If marker 30 completes the connections to the called line, it signals the control circuit 44 (over control leads 84) to lock in permanently the display in indicating circuit 74. As the information is locked in indicating circuit 74, the information, if any, stored in the next higher numbered indicating circuit 76 is erased. If the marker is unable to complete the call, it causes return of busy or overflow tone to the calling subscriber and releases. Release of the marker causes the control circuit 44 to erase the display in indicating circuit 74, without erasing any information stored in the next indicating circuit 76. The next malicious call will now be registered in the same indicating circuit 74.

When all operated and locked-in completing markers have been tested, the control circuit 44 looks again at the completing markers, to see which new ones started operating after it locked in on the previously operated markers. It then locks in the operated completing markers which have not been tested and proceeds to test them. If no further markers have been operated, the line detector circuit remains idle until further markers commence operation.

In normal practice, a crossbar office will contain no more than eight completing markers, and the line detector circuit described will operate sufficiently rapidly to test all eight within the interval of one marker operation. Thus, even if all eight markers operate at once, an unlikely situation, all of the calls being processed by these markers will be tested, the first detected malicious call being registered, and busy tone being returned to any calling subscribers who are making other malicous calls at the time.

DETAILED DESCRIPTION AND OPERATION

Reference is next made to FIGURES 5 and 6, which show typical detector circuits for the detectors 50. FIGURE 5 shows an office code detector circuit or card 88, and a directory number detector circuit or card 90. These detectors are simple AND circuits. The directory number card 90 includes four pairs of input leads D to G respectively, connected through diodes D1 to D8, and through a diode D9, to the base of transistor Q1. The input leads D to G are also connected through resistors R1 to R8 to −48 volts (this being a commonly used telephone potential). The base and emitter of transistor Q1 are connected through resistors R9 and R10 respectively to ground, and the emitter is also connected through resistor R11 to −48 volts. An output from detector card 90 will appear at terminal 92.

The office code card 88 includes three pairs of input leads A to C, these leads being connected through diodes D10 to D15 to an output terminal 94, and being connected through resistors R12 to R17 to −48 volts.

The output terminal 94 of office code card 88 is shown connected to a further input lead (labelled OC/INC) of the directory number card 90 (see also FIGURE 6). The arrangement shown is thus suitable for detecting intra-office or outgoing malicious calls. Of the five A leads in information leads 46 from the marker connectors (FIGURES 3 and 4), an appropriate two are cross-connected (in cross-connection field 48 to the A input terminals of office code card 88. Similar connections are made from the B to G information leads 46 to the B to G input leads of detector cards 88 and 92, depending upon the particular subscriber number (made up of an office code number and a directory number) being cross-connected for detection.

Normally, transistor Q1 is cut off by a negative potential applied at its base through any of resistors R1 to R8, and R12 to R16. However, when the information leads 46 carry (from a completing marker) the subscriber's number cross-connected for detection, ground is received on all of the detector card input leads A to G at once. This removes the negative bias from the base of transistor Q1, permitting it to conduct and provide an output at terminal 92. Such output is amplified by a transistor Q2 in amplifier 51 in a conventional manner, the output from amplifier 51 then actuating a malicious call relay M in the control circuit 44. (The double box lines around relay M in FIGURE 5 indicate that relay M is in the control circuit, and is not part of the detector cards or amplifier 51. This drawing convention will be used throughout.)

A more generalized view of the detector card arrangement is shown in FIGURE 6, where the information leads 46 are shown cross-connected to the detector cards 88 and 90. It is assumed that these cards 88 and 90 are being used for detection of malicious intra-office calls only. It is apparent that only one office code card 88 need be used for all intra-office calls, the output terminal 94 being multiplied (as indicated by the angled line, FIGURES 5 and 6) to a number of directory number cards similar to card 90. All intra-office calls have the same office code, and if that office number, plus a directory number cross-connected for detection, is carried by leads 46, a detector output will be obtained.

Besides intra-office calls, calls from the office 2 to numbers in other offices (outgoing calls) may also be cross-connected for detection. For detection of malicious calls to any other particular office, another office code card, e.g., card 98 (FIGURE 6) similar to office code card 88 may be used, with appropriate cross-connections between its input terminals and information leads 46 providing ground at all its input terminals whenever the desired office number is carried by leads 46. The output of card 98 is connected to the OC/INC input leads of a number of further directory number cards, such as card 100.

For calls incoming from another office a different situation prevails. In such case, as mentioned, called number information leads 46 will typically contain only the directory number digits, not the office code digits, and the directory number digits will be carried by the A to D information leads from the marker, and hence by the A to D leads of information leads 46. No ground or voltage will appear on the E to G information leads 46. Therefore, as shown in FIGURE 6, for incoming calls, an incoming call directory number card 102 is provided with its D to G leads cross-connected directly to the A to D information leads 46. The OC/INC input lead of card 102 is connected to the INC information lead of leads 46, lead INC being grounded when the marker under test is handling an incoming call. The directory number cards are also provided with an IN lead, connected through a resistor R18 (FIGURE 5) to −48 volts. When the directory number card is to be used for incoming calls, the IN lead is cross-connected to the OC/INC lead, to ensure that lack of a ground on the OC/INC lead will maintain transistor Q1 cut off. In this arrangement, the directory number card 102 will produce an output only when an incoming call to a directory number cross-connected for detection is being handled by a marker under test.

Reference is next made to FIGURE 7, which shows the interconnection of leads among the completing markers 30, 32, 34; the marker connectors 36, 38, 40; the cross-connection field 48, and the indicating connectors 52, 54, 56. FIGURE 7 is similar to FIGURE 4, although slightly more detailed in its showing of the interconnections, so that only relatively brief further explanation is needed. As mentioned, the A to G called number information leads from the first marker 30 are connected to information leads 46 by contacts (35 in all, numbered from MCA1/1 to MCA1/35) of relay MCA1. The INC lead from marker 30 is connected to the INC information lead 46 by contact MCA1/36. Operation of relay MCA1 connects all these called number information marker leads to the leads 46 and hence to the cross-connection field 48, and disconnects from the cross-connection field the leads from any higher numbered operated marker connector. (In practice, one relay would not normally have as many contacts as are required for relay MCA1, and several relays in parallel would be used.)

The H to L leads from the first marker 30 (25 leads in all) extend through contacts MCB1/1 to MCB1/25 of first marker connector 36, to the various indicating connectors 52, 54, 56. The N leads from the marker 30 extend through contacts MCC1/1 to MCC1/5 and are then connected to the H leads. This is permissible because the H and N leads of any marker will never carry potentials at the same time; the H leads assist in conveying the calling line location on the line link frame if the call processed by the marker is intra-office or outgoing, while the N leads assist in conveying the calling trunk link frame number if the call is incoming.

The M leads from the marker 30 extend through contacts MCC1/6 to MCC1/8 of marker connector 36, and then join the first three G leads of leads 58 from the cross-connection field 48 (i.e., the G0, 1, 2 leads). This connection is permissible since potentials will exist on the M leads only in the event of an incoming call in which event there will be no potentials on the G leads.

Only the first indicating connector 52 is shown in FIGURE 7, but as indicated, the information leads thereto are also connected to the other indicating connectors. As shown, the called number A to G leads 58 from the cross-connection field 48 pass through contacts ICA1/1 to ICA1/35 of indicator connector 52, to the associated indicating circuit 74. The marker leads M, after passing through contacts of marker connector relays MCC1, MCC2, MCC3, are connected to the first three G leads of leads 58 as mentioned. The marker H leads, after passing through contacts MCB1/1 to MCB1/5, pass through indicating connector contacts ICA1/36 to ICA1/40, to indicating circuit 74. Leads I to L from the marker, after passing through the MCB1 relay contacts of the marker connector, pass through indicating connector contacts ICB1/1 to ICB1/20, and then to the indicating circuit 74. The O, P leads (18 in number) from the trunk link frames 62, 64, 66 are connected to the respective I to L leads (except for the last two L leads, i.e., leads L3, 4). This connection is permissible since the O, P leads carry information (as to trunk location on the trunk link frame) only in the case of an incoming call (in which case, as will be discussed, the contacts of an LD relay on whichever trunk link frame the call comes in on, e.g., contacts LD1/1 to LD1/18, will close and permit potentials on the O, P leads to be registered in the indicating circuit 74). No potentials will be present at this time on the I to L leads (which carry information as to line location on the line link frame).

After passage through the ICB1 relay contacts, the L3, 4 leads are connected respectively to the INC0 and INC1 leads from the control circuit 44, the INC0 and INC1 leads first having passed through indicator connector relay contacts ICB1/21 and ICB1/22. In case of an incoming call, the control circuit will ground the INC0 and INC1 leads to light the two lamps associated with leads L3, L4, thus indicating (see FIGURE 2) that the call is incoming.

A typical indicating circuit, such as indicating circuit 74 of FIGURES 3 and 4, will now be described with reference to FIGURE 8. The indicating circuit 74 includes sixty neon lamps 28, of a type which require approximately 165 volts for firing but considerably less voltage to maintain them lit. One terminal 104 of each lamp 28 is connected through a resistor to −165 volts, while the other terminal 106 of each lamp is connected through a resistor to the control circuit 44 (and to relays therein to be explained presently). The terminals 106 are also connected respectively to the sixty information leads 68 from the indicating connector 52. In operation, ground on appropriate ones of the information leads 68 from the indicating connector 52 will light appropriate lamps 28 to register a display in indicating circuit 74. This ground is present only for a short time and is then removed, at which time the duration of the display is controlled by relays in the control circuit 44. If −48 volts is applied to the terminals 106, the lamps already lit will remain lit; and if the terminals 106 become open circuited, the lit lamps will be extinguished.

The remainder of the detailed circuit indicated generally in the block diagrams of FIGURES 3 and 4 will next be described, with reference to FIGURES 9 to 14. Because these drawings are complex, a "road map" convention for reference to them has been adopted. Numerals extend along one side of these drawings and letters along another side, to indicate the coordinates at which a point of interest is located. For example, "FIGURE 9, A3" indicates that the location referred to is defined by coordinates A and 3 in FIGURE 9. As an additional aid, a sequence chart (FIGURE 9) will be used. Sequence charts are commonly used in the telephone art to indicate the sequence in which relays operate, an "X" indicating operation of a relay, and a "—" indicating release of a relay. In the drawings showing relay contacts, a standard convention is also used, an "X" indicating that a relay contact is open when the relay is released, and a "—" showing the contact to be closed when the relay is released.

A line and arrow angling from a lead indicates that the lead is multipled, as already discussed. A boxed-in portion indicates that the area boxed in is part of a circuit different from that adjacent the boxed-in area, as mentioned.

In addition, a distinction will be made between an operate path for a relay (the path over which the relay operates) and a locking path for a relay (the path over which it locks operated). When these paths are only partly completed by the closing of a particular relay contact, they are said to be "prepared" by the opening of that contact.

In the course of the description, a number of relays will be referred to, and for convenience, they are listed in Table I below, together with a brief comment on each. Many of these relays are also shown in the FIGURE 4 block diagram.

TABLE I

Marker Connector Relays

MCA, MCB, MCC

One set occurs in each marker connector, e.g. for the first marker connector 36, the relays are MCA1, MCB1, MCC1.

Indicating Connector Relays

ICA, ICB

One set occurs in each indicating connector 52, 54, 56, e.g. for the first indicating connector 52, these relays are ICA1, ICB1.

Marker Connector Control Relays

CC: call, checked relay
MR: malicious call recording relay
MRA: auxiliary to relay MR
BY: busy relay One set is present for each marker connector, e.g. for first marker connector 36, these relays are CC1, MR1, MRA1, BY1. They are located in control circuit 44.

Indicating Connector and Indicating Circuit Control Relays

L$i$: Lamp indicating relay
P$i$: preferred indicating circuit relay

One set occurs (in the control circuit 44) for each indicating connector and its associated indicating circuit, e.g. for first indicating connector 52 and its indicating circuit 74, these relays are P$i$1 and L$i$1.

Overall Control Relays

M: malicious call relay
MA: auxiliary to relay M
ML: marker lockout relay
MCK: malicious call check relay
RL: release relay
OK: OK relay (indicates connection can be completed to called number)
OKL: lockout relay for OK relay These relays (one only of each) are in control circuit 44.

Incoming Call Relays

IN: incoming call relay
INA: auxiliary to relay IN
INCD: incoming call display relay These relays (one only of each) are in control circuit 44 and operate when an incoming call is received.

Alarm Relays

ALM: alarm relay
CCK: check relay for CC relays
DCK: diode check relay
RCK: release check relay These relays (one only of each) are in control circuit 44.

Relays in No. 5 cross bar office

MKR: relay in completing marker (to ground "start" lead to control circuit). One such relay is present in each marker, e.g. relay MKR1 for marker 30.
LCK: marker trunk link relay, operative after the marker receives information from its associated trunk link frame, to release the LD relay (to be discussed) in the trunk link frame. One such relay for each marker, e.g. relay LCK1 for marker 30.
LK: marker relay operative if marker completes connections to called number (it grounds an OK lead to an OK relay, as will be discussed). One such relay for each marker, e.g. relay LK1 for marker 30.
B: Busy relays, one in each marker, e.g. relay B1 for marker 30. Upon operation, it causes marker to cause register to return busy or overflow tone to calling subscriber, the marker then releasing.
LD: relay (in trunk link frame) which operates upon seizure of trunk link frame by a marker (through a trunk link frame connector) and closes contacts to transmit calling trunk location information to the indicating connectors.

(1) Seizure

Operation of the line detector circuit commences when a completing marker, here assumed to be the first completing marker 30 in the crossbar office 2, is seized by its associated incoming register (not shown, except in FIGURE 1). When the marker 30 is so seized, a relay MKR1 therein (the coil of relay MKR1 is not shown) operates and closes contact MKR1/1 (FIGURE 10, J6) grounding a start lead ST1 to the line detector control circuit 44. Start lead ST1 is one of the control leads 84 shown in FIGURES 3 and 4 as extending between the markers and the control circuit 44.

Ground on lead ST1 operates the first marker connector relay MCA1 (FIGURE 10, C5) through contacts CC1/2 and ML/1 (to be discussed presently) if the line detector circuit has previously been idle. Other marker connector relays, e.g. relay MCA2, can also be operated at this same time, depending on how many completing markers are operated and have not been checked.

1.1 When first marker connector relay MCA1 operates:
(1) It locks operated under control of call check relay CC1 (to be referred to in more detail later). The locking path is through contact MCA1/40 (FIGURE 10, D5), contact CC1/3 (FIGURE 10, F5), and contact ALM/2 (FIGURE 10, F4) to ground.
(2) Its contact MCA1/41 (FIGURE 10, D6) operates marker lockout relay ML (FIGURE 10, F0).
(3) It prepares operate paths for three of the control relays associated specifically with the first marker connector, namely call check relay CC1, busy relay BY1, and malicious call recording relay MR1. Relay CC1 is shown at FIGURE 10, F6 and the contacts which prepare its operate path are contacts MCA1/42 and MCA1/43 (FIGURE 10, C6). Busy relay BY1 appears at FIGURE 10, F7 and its operate path is prepared by contact MCA1/44 (FIGURE 10, D7). Malicious call recording relay MR1 appears at FIGURE 11, D6, and its operate path is prepared by contacts MCA1/45 (FIGURE 11, B6).

(4) Finally, relay MCA1, in operating, connects leads A0, 1, 2, 4, 7 to G0, 1, 2, 4, 7 and ICN from the completing marker 30 to information leads 46 (contacts MCA1/1 to MCA1/36, FIGURE 7) towards the cross-connection field 48, and locks out from the cross connection field all higher numbered marker connector leads.

1.2 When marker lockout relay ML (FIGURE 10, F0) operates (due to operation of relay MCA1, as mentioned):

(1) It opens the start leads to all of the marker connector relays, i.e. contact ML/1 (FIGURE 10, E5) opens lead ST1 to relay MCA1; contact ML/2 (FIGURE 10, E9) opens lead ST2 to relay MCA2, and contact ML/3 (FIGURE 10, E12) opens lead ST3 to relay MCA3. This prevents any unoperated marker connector relays from being operated later on, and thus prevents possible later interference with the sequence of tests being done on the completing markers whose marker connector relays (e.g. relays MCA1) are operated and locked in.

(2) Its contact ML/4 (FIGURES 10, C4) closes to connect ground to relay CCK (FIGURE 10, A0), tending to shunt this relay down. Relay CCK is a normally operated slow release check relay for the CC relays (as will be described) and will not release if relay CC1 operates within its allotted time. The path for the ground in question is through contacts MCK/1 or MA/2 released (FIGURE 10, B2 and C2), diode D30, and contacts ML/4, MCA1/43, CC/1 to relay CCK.

(3) The closing of contact ML/4 also completes the operate path for the CC relay of the lowest numbered operated marker connector, i.e. relay CC1, through contacts MCA1/42 and MCA1/43 (FIGURE 10, C6), contact ML/4, and either of contacts MCK/1, or MA/2 to ground. The lead containing contact ML/4 is designated as lead 110, the CC relay control lead.

(4) In addition, contact ML/5 (FIGURE 11, B5) closes and prepares the operate path for the MR relays MR1 to MR3. The lead containing contact ML/5 is designated as lead 112, the MR relay control lead.

(5) Finally, contact ML/6 (FIGURE 14, F7) prepares an operate path for a lamp CCKL (FIGURE 14, I9) as will be described.

The stage of operation now reached is shown in the sequence chart, FIGURE 9, C8. Relays MKR1, MCA1, and ML have operated.

(2) Testing

Because of the closing of contacts MCA1 to 36 (FIGURES 4 and 7), the called number information in the first completing marker 30 is transmitted over leads 46 to the cross-connection field 48 and hence to the detectors 50 for test. If the call is malicious, an output will be obtained from one of the detector circuits, amplified in amplifier 51, and transmitted to the control circuit 44 where it operates malicious call relay M (FIGURE 5). Relay M is a relatively fast operate relay, faster than the CC relays.

2.1 While the testing of the called number is occurring, called number relay CC1 operates, as mentioned, see item 1.2(3). When relay CC1 operates:

(1) Its contacts CC1/1 (FIGURE 10, B6) operate and remove the shunt across the CCK relay. This allows the CCK relay to remain in its normally operated condition. (Had relay CC1 not operated, relay CCK would have shut down and signalled an alarm).

(2) It locks operated to start lead ST1 (due to operation of contacts CC1/2 at FIGURE 10, E6).

(3) It opens start lead ST1 to marker connector relay MCA1 (due also to operation of contacts CC1/2 at FIGURE 10, E6) thus opening the operate path for relay MCA1.

(4) Its contacts CC1/3 (FIGURE 10, F5) transfer the locking path of relay MCA1 to contact M/1 (FIGURE 10, G0) of the malicious call relay M. If relay M is released, the called number is not that of a subscriber cross-connected for malicious call detection, no registration is required, and the locking path of relay MCA1 having been transferred through open contact M1, relay MCA1 releases.

(5) Operation of relay CC1 prepares an operate path for malicious call recording auxiliary relay MRA1 (FIGURE 11, F7) by operation of contact CC1/4 (FIGURE 11, F7).

(6) Operation of relay CC1 prepares a locking path for busy relay BY1 (contact CC5 at FIGURE 10, E7) and for preferred indicating circuit relay P*i*1. Relay P*i*1 (to be discussed in detail presently) is shown at FIGURE 12, E6 and its locking path is prepared by contact CC1/6 at FIGURE 12, G3.

(7) Finally, contact CC1/7 (FIGURE 14, G9) opens to open on operate path for alarm relay ALM (FIGURE 14, F14) as will be described.

(3) Normal Call (i.e. not malicious)

If the call is not malicious, relay M (FIGURE 5) remains released. No registration is needed and the connection from the completing marker 30 to the detectors 50 is released, as mentioned, when relay CC1 transfers the locking path of first marker connector relay MCA1 to contact M/1 of the M relay. This operation is shown at point C14 on the sequence chart, FIGURE 9.

When relay MCA1 releases:

(1) Its contacts MCA1/1 to MCA1/36 (FIGURE 7) disconnect leads A0, 1, 2, 4, 7 to G0, 1, 2, 4, 7 and INC of the first completing marker 30 from the cross-connection field 48 and connect corresponding marker leads of the next higher numbered operated marker connector (e.g. intermediate marker connector 38) to the cross-connection field for test.

(2) Release of relay MCA1 also prepares the operate paths for the control relays CC2, BY2, MR2, and MRA2 of the next higher numbered operated marker connector, e.g. marker connector 38. More specifically; contacts MCA1/42 and 43 (FIGURE 10, C6) transfer the CC relay control lead 110 from relay CC1 to relay CC2, provided that marker connector relay MCA2 is operated. Contact MCA1/44 (FIGURE 10, C7) transfers a lead 114, the BY relay control lead, from relay BY1 to relay BY2, and contact MCA1/45 (FIGURE 11, B6) transfers the MR relay control lead 112 from relay MR1 to relay MR2, again if relay MCA2 is operated. Auxiliary relay MRA2 (FIGURE 11, F7) is operated by relays CC2 and MR2.

(3) If there is another marker connector called number part relay, such as relay MCA2, operated when relay MCA1 releases, the same test is performed on its completing marker 32 as described above. The sequence of operations on the sequence chart, FIGURE 9, is from point E23 back to point B11.

(4) If no other marker connector called number part relays (e.g. relay MCA2 or MCA3) are operated when relay MCA1 releases, then the opening of contact MCA1/41 (FIGURE 10, D6) releases the marker lockout relay ML. The point of operation now reached is shown on the sequence chart, FIGURE 9, at point D20.

When relay ML releases, it opens the operate path (not locking path) for all of the CC relays (due to opening of contact ML/4 at FIGURE 10, C4) and reconnects all the start leads ST1 through ST3 from the completing markers to their associated marker connector relays MCA1 to MCA3 (contacts ML/1 to ML/3 at FIGURE 10, E5, E9, and E12 respectively), except those start leads (in this case lead ST1) where the CC relay is still held operated by the operated completing marker. Call check relay CC1 remains operated for the duration of the operation of completing marker 30, because of its connection through contacts CC1/2 operated (FIGURE 10, E6) to the grounded start lead ST1. Its contacts CC1/2 thus prevent further operation of first marker connector relay MCA1 and thus prevent a second test of the call handled by marker 30. When marker 30 eventually releases, ground is removed from start lead ST1 and relay CC1 releases (point E14 on the sequence chart, FIGURE 9) reconnecting start lead ST1 through contact ML/1 to relay MCA1.

If no new markers are operated, the circuit remains idle in this condition until a marker commences operation. Further operation of the circuit is the same as just described.

(4) Malicious Call (Intra-Office or Outgoing)

If the malicious call relay M (FIGURE 5) is operated, the called number is one of the numbers cross connected for detection; the call is malicious and will be registered.

4.1 As the operate path for relay CC1 is completed (by relay ML, as described), relay M operates, and if the line detector circuit is not busy registering a previous malicious call, then when relay M operates:

(1) It operates auxiliary malicious call relay MA (FIGURE 10, D0) due to closing of contact M/1 (FIGURE 10, G0). The closing of contact M1, also shown at FIGURE 11, B3, also operates malicious call recording relay MR1 (FIGURE 11, D6). The operate path for relay MR1 is from ground through contacts M/1, RL/2, ML/5, and MCA1/45 to the MR1 relay coil. Release relay RL (to be discussed presently) is unoperated at this time, while relays ML and MCA1 are operated, as can be seen from the sequence chart, FIGURE 9.

(2) Operation of relay M completes the operate path for release check relay RCK (FIGURE 14, H14) due to closing of contact M/2. Relay RCK is a slow operate alarm relay, to be discussed later, and will not operate if relay M releases properly.

(3) Relay M operation provides a locking path for marker connector relay MCA1, through contacts CC1/3 (FIGURE 10, F5) and M/1 (FIGURE 10, G0). It will be recalled, from item 2.1(4) that the locking path of relay MCA1 was transferred to the M relay contact M/1 by the relay CC1, and were relay M not operated, relay MCA1 would release.

4.2 When auxiliary malicious call recording relay MA (FIGURE 10, D0) operates (due to operation of relay M contact M/1):

(1) It locks operated under control of malicious call check relay MCK (FIGURE 10, A0) relay MCK, which is released at this time, will be discussed presently. The locking path for relay MA is through contact MA/1 (FIGURE 10, D1) or MA/2 (FIGURE 10, C2), and contacts MCK/1 released (FIGURE 10, B2) to ground.

(2) Operation of contacts MA/2 also opens one of the operate paths for relay CC1; see item 1.2(3).

(3) Contact MA/3 (FIGURE 14, B15) partly prepares the operate path for release relay RL (FIGURE 14, B15). The operate path for relay RL is through a series of contacts, as will be discussed presently.

(4) Operation of relay MA releases malicious call relay M (contact MA/4, FIGURE 5).

(5) Further, relay MA provides a locking path for relay MCA1, the locking path through contact M/1 (FIGURE 10, G0) having disappeared with the release of relay M. The locking path now provided is through contacts MCA1/40 (FIGURE 10, D5), CC1/3 (FIGURE 10, F5), ALM/3, MA/2 (FIGURE 10, C2), and MCK/1 to ground.

(6) Contact MA/5 (FIGURE 10, A2) closes to prepare the operate path for the malicious call check relay MCK (FIGURE 10, A0), to be later discussed.

(7) Finally, contact MA/6 (FIGURE 14, H11) completes another operate path for release check relay RCK, the operate path through contact M/2 having released when relay M released. Relay RCK is, as mentioned, a slow operate alarm relay (to be discussed later) and will not operate if release relay RL operates on schedule to open contact RL/6 (FIGURE 14, H12).

4.3 When the malicious recording relay MR1 is operated (by contact M/1 at FIGURE 11, B2):

(1) It completes the operate path for auxiliary malicious call recording relay MRA1 (FIGURE 11, F7) due to closing of contact MR1/1 at FIGURE 11, G7. Relay MRA1 now operates, through contacts CC1/4, MR1/1, and RL1/8 (FIGURE 11, G6) to ground.

(2) Relay MR1 operation grounds start lead ST1 (contact MR1/2 at FIGURE 10, H6). This is merely a precaution, in case the marker for some reason releases before the line detector circuit can complete its functions. This connection retains ground on the start lead ST1 and enables the line detector circuit to cycle and release without actuation of any of its alarm circuits, which circuits will be described presently.

(3) Contact MR1/3 (FIGURE 10, H3) closes and provides an additional locking path for relay MCA1.

(4) Contact MR1/4 (FIGURE 8) connects −48 volts to the indicating lamps 28 in any idle indicating circuit, i.e. in any indicating circuit where the associated lamp indicating relay L$i$ (to be discussed later) is not operated.

(5) Contact MR1/5 (FIGURE 12, D2) closes and operates the preferred indicator connector relays (ICA and ICB). Which set of these relays operates depends upon in which indicating circuit information was last registered, because as previously mentioned, malicious call information is registered in the indicating circuits in sequence, first in the first indicating circuit 74, then in the next indicating circuit, and so on, in a cycle. Selection of the preferred indicator connector relays ICA, ICB depends upon the L$i$ relays. Indicator connector control leads 116, 118 are provided (FIGURE 12, C5 and D5), to which the various indicating connector relays ICA, ICB1, etc. are connected in a preference chain, through the L$i$ relay contacts. If for example, relay L$i$1 (FIGURE 13, B7) is released, then contacts L$i$1/2 and L$i$1/3 are released, and contact MR1/5 (FIGURE 12, D2) connects ground (through contacts RL/3 and 4) to relays ICA1 and ICB1 to operate these relays.

(6) Contact MR1/6 (FIGURE 12, F2) closes to ground a P$i$ relay control lead 120, to operate a preferred indicating relay, here relay P$i$1 (FIGURE 12, E6), assuming relay L$i$1 to be released and hence contacts L$i$1/4 to be released.

(7) Operation of contacts MR1/7 and MR1/8 (FIGURE 11, D7 and D8) operates the calling number part of first marker connector 36, i.e. either relay MCB1 or MCC1 (FIGURE 11, C7 and C8) depending on the condition of incoming call relay contacts IN/1 (FIGURE 11, E5). Since this is assumed to be an intra-office or outgoing call, and not an incoming call, relay IN is released (as later explained) and relay MCB1 operates, rather than relay MCC1.

As previously discussed, operation of relay MCB1 connects the H to L leads (FIGURES 4 and 7) from completing marker 30 to the preferred indicating connector (here assumed to be indicating connector 52), and hence to its associated indicating circuit.

(8) Finally contact MR1/9 (FIGURE 11, E8) prepares an operate path for the incoming call auxiliary relay INA (FIGURE 11, G3) to be discussed later.

4.4 When malicious call auxiliary relay MRA1 (FIGURE 11, F7) operates (item 4.3(1) as discussed):
(1) It locks operated, through its contact MRA1/1 (FIGURE 11, G7).
(2) Its contact MRA1/2 at FIGURE 12, G2 completes a locking path for relay $Pi1$, which has just operated, see item 4.3(6). The locking path is through contacts $Pi1/1$ (FIGURE 12, F7), CC1/6 (FIGURE 12, G3) and MRA1/1.
(3) Operation of contact MRA1/3 at FIGURE 13, G1 prepares an operate path for the OK relay (FIGURE 13, G5). The OK relay (to be discussed later) operates if the called line is not busy and a connection can be completed thereto, to permit permanent locking in of information stored temporarily in the indicating circuit.
(4) Contacts MRA1/4 (FIGURE 14, C7) operate to assist in preparing the operate path for release relay RL (FIGURE 14, B15). It will be noted that relays MRA2 and MRA3 also have contacts MRA2/4a and MRA3/4a, which are for use in case more than one MRA relay operates at a time, which would be a malfunction and indicates an alarm condition, as will be described.
(5) Contact MRA1/5 at FIGURE 14, E11, prepares a locking path for relay RL (when relay RL operates).
(6) Operation of contact MRA1/6 (FIGURE 14, G9) prepares a path in a trouble detection circuit (to be described later) so that if relay MRA1 fails to release within a short time, after relay CC1 releases, the alarm relay ALM (FIGURE 14, F14) will operate.
(7) Contact MRA1/7 (FIGURE 10, A6) closes and operates malicious call check relay MCK (FIGURE 10, A1). The operate path for relay MCK is through contacts MA/5 (FIGURE 10, A2), MRA 1/7, CC1/1, MCA1/43, ML/4, diode D30, MA/2 operated, and MR1/3 operated to ground.
(8) Contact MRA1/8 (FIGURE 10, E7) opens to open the operate path for busy relay BY1, to be later discussed.
(9) Contact MRA1/9 (FIGURE 11, E8) closes to prepare a locking path for relay MCC1, in case of an incoming call (to be later discussed).
(10) Contact MRA1/10 (FIGURE 11, H7) closes to prepare a locking path for incoming call auxiliary relay INA, to be described.

4.5 When malicious call check relay MCK operates:
(1) It locks operated, under control of the MA relay (contact MA/5 at FIGURE 10, A1) due to operation of contacts MCK/1 (FIGURE 10, B2).
(2) Operation of contacts MCK/1 opens one of the connections between lead 110 and ground, i.e.
it opens the operate path for the CC relays. Any operated CC relays remain operated, however, due to their locking paths.
(3) Operation of contacts MCK/1 also transfers the locking path of relay MA through the contacts of relay MCA1. The locking path for relay MA is now through contacts MA/1, ML/4, MCA1/43, and then either through contacts CC1/1, MRA1/7, and MCK/1 to ground, or through contacts MCA1/42, CC1/2 to the grounded start lead ST1.

4.6 When the preferred indicating circuit $Pi$ relay, here assumed to be relay $Pi1$ (FIGURE 12, E6) operates (due to operation of malicious call recording relay MR1, see item 4.3(6)):
(1) It locks operated, through contacts $Pi1/1$ (FIGURE 12, F7), CC1/6, MRA1/1, see item 4.4(2). Contact $Pi1/1a$ at FIGURE 12, G6, also closes and prepares a further locking path for relay $Pi1$, as will be described.
(2) It prepares an operate path for the lamp indicating relay $Li1$ in the same indicating circuit 74. This occurs as contact $Pi1/2$ (FIGURE 13, D7) closes. Relay $Li1$, as will be discussed, will eventually operate to lock-in any information registered in indicating circuit 74, provided that a connection can be completed to the called number (in which case the OK relay operates to close contact OK/3 at FIGURE 13, E4).
(3) Operation of relay $Pi1$ prepares the release of the $Li$ relay (if operated) in the next indicating circuit, i.e. relay $Li2$ (FIGURE 13, B10). Relay $Li2$ is not released yet, but when relay $Li1$ eventually operates to lock information in indicating circuit 74, then relay $Li2$ will be released, in accordance with the scheme by which, as information is registered in one indicating circuit, the information in the next indicating circuit is erased, so that information concerning the next malicious call will be registered in that next indicating circuit.

More specifically, before relays $Pi1$ and $Li1$ operate, relay $Li2$ has two locking paths, one through contacts $Li2/1$ operated (FIGURE 13, C10), $Pi1/3$ released and ground, and one through contacts $Li2/1$ operated, $Li1/1$ released, and $Pi3/3$ released to ground. Operation of relay $Pi1$ operates contacts $Pi1/3$ (FIGURE 13, D8) to open one of these locking paths.
(4) Operation of relay $Pi1$ provides additional battery to the indicating lamps 28 in indicating circuit 74, as contact $Pi1/4$ closes (FIGURE 13, J7 and FIGURE 8). Thus, when relay MR1 releases to open contact MR1/4 (FIGURE 8 and FIGURE 13, H15) as will occur shortly, any lit indicating lamps 28 will remain lit (although even at this point, the information will be stored in indicating circuit 74 only temporarily, until relay $Li1$ operates).
(5) The $Pi1$ relay operation further prepares the operate path of the release relay RL (FIGURE 14, C15) due to operation of contacts $Pi1/5$ (FIGURE 14, C11). It will be noted that relays $Pi2$ and $Pi3$ include contacts $Pi2/5a$ and $Pi3/5a$, for use in case more than one $Pi$ relay at a time operates, which would indicate a malfunction and would require an alarm to be sent out, as will be explained.
(6) Contact $Pi1/6$ (FIGURE 14, E10) provides another locking path for relay RL.

4.7 It will be recalled that marker connector relay MCB1 has also operated at this time. Its operation was caused by relay MR1, see item 4.3(7), and also the sequence chart, FIGURE 9, at point F5. When relay MCB1 operates:

(1) Its contact MCB1/40 (FIGURE 10, D5) closes to provide an additional locking path for relay MCA1.
(2) It further prepares the operate path for relay RL, as contact MCB1/41 (FIGURE 14, C4) closes.
(3) It closes contacts MCB1/1 to MCB1/25 (FIGURES 4 and 7) to connect marker 30 leads H0, 1, 2, 4, 7, to L0, 1, 2, 3, 4 (carrying information as to calling line location on the line link frame) to the indicating connectors.

4.8 In addition, the first indicating connector relays ICA1 and ICB1 have now been operated, also by malicious call recording relay MR1, see item 4.3(5) and the sequence chart, FIGURE 9, at point E8. When relays ICA1 and ICB1 operate:
(1) Their contacts ICA1/1 to ICA1/40 and ICB1/1 to ICB1/20 (FIGURES 4 and 7) close and transmit the information regarding the called number, and calling line location on the line link frame, to the lamps of the first indicating circuit 74.
(2) Their contacts ICA1/41 and ICB1/41 (FIGURE 14, C1 and C2) complete the operate path for the RL relay, thus operating this relay.
(3) Contact ICA1/42 (FIGURE 10, I2) closes to provide a further locking path for relay MCA1.

4.9 Release relay RL, when operated, indicates that information as to called and calling numbers has been temporarily stored in an indicating circuit. As has been seen, it operates when all the relays used in completing a path from the marker to the indicating circuit have operated. Relay RL now begins the release cycle, and also causes the control circuit 44 to ensure that no other path will be completed to this indicating circuit 74 until the information has been erased or locked in permanently.
When relay RL operates:
(1) It locks operated under control of the same relays that operated it, i.e. it locks operated through contact RL/1 (FIGURE 14, D14) and any of contacts MRA1/5, P$i$1/6, and ICB1/42.
(2) It releases relays MR1, ICA1, ICB1 and MCB1, as follows. Contact RL/2 at FIGURE 11, B4 releases relay MR1. Contacts RL3 and RL4 at FIGURE 12, D4, release relays ICA1 and ICB1 respectively. Contact RL/5 (FIGURE 11, E4) releases relay MCB1.
(3) Contact RL5 (FIGURE 11, E4) also opens the operate path for relay MCC1. Relay MCC1 has not operated; it operates only in case of an incoming call, but if it had operated, the opening of contact RL/5 would not necessarily release it, since it also has a locking path to be discussed later.
(4) Relay RL operation opens the operate paths for relays RCK, P$i$1, MRA1, and INA, as follows. Contact RL/6 at FIGURE 14, H12 opens the operate path for release check relay RCK. If relay RL operates in time, relay RCK (which is slow operate) thus does not operate, but if relay RL fails for some reason to operate, relay RCK operates and signals an alarm, as will be described.
Contact RL/7 at FIGURE 12, F4 opens the operation path for the P$i$ relays, including relay P$i$1 (which however remains operated due to its locking path through contacts CC1/6 and MRA1/1).
Contact RL/9 at FIGURE 11, F3, opens the operate path for relay MRA1 (which however remains locked operated through contacts CC1/4 and MRA1/1).
Contact RL/9 att FIGURE 11, F3, opens the operate path for incoming call auxiliary relay INA, to be later described. Relay INA operates only in the event of an incoming call.

(5) Release relay contact RL/10 at FIGURE 13, G3 closes and prepares an operate path for the OK relay, while contact RL/11 at FIGURE 13, H3 closes to prepare an operate path for the OK lockout relay OKL. The OK and OKL relays will be discussed presently.
(6) Finally, contact RL/12 (FIGURE 10, C4) closes and prepares an operate path for the busy (BY) relays, as will be discussed presently.

4.10 The situation is now as shown on the sequence chart, FIGURE 9, at point F8. Relays MR1, MCB1, ICA1, ICB1 have (among others) released. When these relays release, the locking paths for relay MCA1 are released, as seen from FIGURE 10. Contact MR1/3 FIGURE 10, H3) opens to remove one ground; contact ICA1/42 opens and removes another ground; contact MCB1/40 (FIGURE 10, D5) removes a further ground, and since relay MCK is operated, contact MCK/1 FIGURE 10, B2) has opened to remove the only other available ground.
When relay MCA1 releases:
(1) Its contacts MCA1/1 to MCA1/36 FIGURES 4 and 7) release and connect the marker A0, 1, 2, 4, 7 to G0, 1, 2, 4, 7 leads from the next operated marker connector to the cross connection field 48 and hence to the detectors 50 for test.
(2) The control leads for the CC, BY and MR relays are transferred from relays CC1, BY1, MR1 to corresponding relays of the next operated marker connector, e.g. relays CC2, BY2, MR2. More specifically, contacts MCA1/43 (FIGURE 10, C6) release to connect CC relay control lead 110 toward relay CC2. Contacts MCA1/44 (FIGURE 10, C7) perform a similar task for the BY relay control lead 114, while contacts MCA1/45 (FIGURE 11, B6) perform a similar task for MR relay control lead 112.
(3) When contacts MCA1/43 (FIGURE 10, C6) release, this opens the locking path for relay MA, see item 4.5(3), thus releasing relay MA.

4.11 When relay MA releases:
(1) Its contacts MA/2 (FIGURE 10, C2) release, and prepare again one of the operate paths for the CC relays, e.g. relay CC2. This operate path is through contacts MA/2, diode D30, and contacts ML/4 toward the CC relays; see item 1.2(3). Recall that the other operate path, through contacts MCK/1, disappeared when relay MCK operated, see item 4.5(2).
(2) Its contact MA/4 (FIGURE 5) reconnects relay M to the detector circuits.
(3) Its contact MA/5 (FIGURE 10, A1) opens to release relay MCK.

4.12 With the release of malicious call check relay MCK, the circuit has returned to a condition in which it is ready to test the next call. The situation has now reached the point indicated on the sequence chart FIGURE 9, at point H8. It is not yet known whether the called number is busy, or whether the completing marker 30 will be able to complete the call that it is processing, and this information will not be available for a short period of time, due to the interval required for operation of the completing marker. In the meanwhile, however, the line detector circuit is ready to test any further completing markers that were operated at the time of operation of the first completing marker 30. It should be noted that if a malicious call is now detected in another completing marker, no information as to this second malicious call can be registered, because final registration of the first malicious call data has not yet been completed. However, it is possible to check other completing markers at this time.

If other completing markers were operated at the same time as first completing marker 30, the next completing marker connected to the detector circuit for test is the next lowest number of those operated markers, e.g. marker 32, since it will have the lowest numbered operated marker connector.

The same tests are performed on marker 32 as described above, unless a malicious call is detected while the circuit 44 is busy registering a previous malicious call. In that event, a signal is returned to completing marker 32, to cause it to assume a "busy" condition, as will be described later. The test of further markers, during final registration of the malicious call from the first marker 30, is indicated by the horizontal line in the sequence chart starting at point H8 and extending to the right to point H17 and beyond.

It may be that when the circuit has reached the condition denoted in the sequence chart at point H8 (i.e. is ready to test further completing markers), there are no other marker connector called number points (the MCA relays) operated. For example, it may be that when the first completing marker 30 operated (opening contacts ML/2, ML/3, FIGURE 10, E9 and E12 to disconnect start leads ST2 and ST3 from marker connector relays MCA2 and MCA3), no other markers were operated. If another marker, e.g. marker 32, operated after marker 30 so operated, its grounded start lead ST2 cannot operate relay MCA2 because of open contact ML/2, FIGURE 10, E9. This arrangement, as mentioned, is so that if one marker is under test, subsequent operation of another marker cannot interfere with that test.

If the circuit is ready to test another marker, and no other marker connector relays are operated, relay ML will release (due to opening of contact MCA1/41, FIGURE 10, D6). This reconnects the start leads from all completing markers to their associated marker connector relays, except the start leads from markers already checked or being checked, which leads are held open by the operated CC relay, see item 3(3), and all marker connectors of the operating completing markers which have not been tested operate. Further testing is as described above.

(5) Permanent Registration

While the operations described above are occurring, the control circuit waits for further information from the first completing marker 30 as to whether to erase or to lock in permanently the information stored in indicating circuit 74. If the marker is unable to complete the connection to the called line, the information will be erased, while if the completing marker is able to complete the connection the information will be locked in permanently.

(6) Busy Condition

If the called line is busy, or if the completing marker 30 is unable to complete the connection due to an all channels busy condition, marker 30 releases and causes its associated register (shown in FIGURE 1) to return busy or overflow tone to the calling line in the normal manner.

(1) As marker 30 releases, ground is removed from start lead ST1, causing relay CC1 (FIGURE 10, F6) to release (recall that relay MR1 has already released to open contact MR1/2 at FIGURE 10, H6). See the sequence chart, FIGURE 9, at point N15.

(2) When relay CC1 releases, its contact CC1/6 (FIGURE 12, G3) opens, releasing preferred indicating relay P$i$1. Release of relay P$i$1 opens its contact P$i$1/4 (FIGURE 8 and FIGURE 13, 17), removing −48 volts from the indicating lamps 28 of first indicating circuit 74. The lit lamps of indicating circuit 74 thereby extinguish, releasing the stored information.

(3) Release of relay CC1 also opens contact CC1/4 (FIGURE 11, F7) thus releasing relay MRA1. Release of relay MRA1 opens contact MRA1/3 (FIGURE 13, G1) opening the operate path of the OK relay so that it cannot operate.

(4) Release of relay MRA1 and P$i$1 also releases relay RL, due to opening of contacts MRA1/5 and P$i$1/6 (FIGURE 14, E11 and E10).

(5) When relay RL releases, it reconnects the operate paths that it previously opened, for the connector and control relays MR1, ICA1 and ICB1, MCB1 (and MCC1), RCK, P$i$1, MRA1 and INA; see items 4.9(2) to 4.9(4).

(6) Relay RL in released condition thus indicates that the circuit is ready to register another malicious call. The point of operation now reached is shown on the sequence chart, FIGURE 9, at point O15. The next malicious call will be registered in the same indicating circuit 74 from which the temporarily stored information was just erased.

(7) OK Condition

If the first completing marker 30 is able to complete the connection to the called subscriber, a marker relay LK1 (not shown) operates, closing contact LK1/1 (FIGURE 13, G0) to ground an OK relay control lead 122. The OK control lead 122 is included in the control leads 84 between the completing markers and the control circuit 44.

7.1 Ground on lead 122 operates relay OK (FIGURE 13, G5) as shown in the sequence chart, FIGURE 9, at point L8. When relay OK operates:

(1) It locks operated, through contact OK/1 (FIGURE 13, G4) and any of (a) contact OKL/1, FIGURE 13, F3 to ground (b) contacts L$i$1/7 released and P$i$1/3 operated to ground (c) contacts L$i$2/7 operated and P$i$1/3 released to ground, assuming that relay L$i$2 is operated and information is stored in the lamps of the second indicating circuit 76.

(2) Its contact OK/2 at FIGURE 13, H4, operates the OK lockout relay OKL.

(3) Its contact OK/3 at FIGURE 13, E4, completes the operate path to the selected lamp indicating (L$i$) relay, here relay L$i$1.

(4) Its contacts OK/4 at FIGURE 12, C1 operate to provide an additional locking path for relay P$i$1. Relay P$i$1 now has temporarily, three locking paths. These locking paths are all through contact P$i$1/1 (FIGURE 12, F7) and then are respectively: (a) through contacts CC1/6 and MRA1/1 operated, to ground (b) through contact P$i$1/1a operated, contacts L$i$1/5 released (since relay L$i$1 has not yet operated, although its operate path has been completed and it is now in the process of operating), and then through contacts OK/4 to ground (c) through contact P$i$1/1a, operated, contacts L$i$2/5 operated (assuming that relay L$i$2 is operated and information is stored in the second indicating circuit 76), and through contacts OK/4 to ground.

(5) Its contact OK/5 at FIGURE 14, I12 closes to complete an operate path for release check relay RCK. As mentioned, relay RCK is a slow operate relay and will not operate if relay OK releases shortly, as will be described.

(6) Its contact OK/6 (FIGURE 14, E9) provides an additional locking path for relay RL.

(7) Its contact OK/7 (FIGURE 11, F15) opens a locking path for the MCC relays, as will be described presently.

7.2 When the OK lockout relay OKL (FIGURE 13, H6) operates (due to operation of relay OK, see item 7.1(2)):

(1) It locks operated, through contact OKL/2 at FIGURE 13, I4.

(2) Its contact OKL/3 at FIGURE 13, G4 opens the operate path for the OK relay, so that the OK relay will not be held or reoperated after its functions are completed.

(3) Its contact OKL/1 at FIGURE 13, E0 opens one of the locking paths for the OK relay, providing an indication that relay OKL has operated. (If relay OKL failed to operate, contact OKL/1 would remain closed, relay OK would remain locked on, and alarm relay RCK, see item 7.1(5), would soon function to send out an alarm as will be described.)

(4) Its contact OKL/4 (FIGURE 11, H3) opens one of the locking paths for incoming call auxiliary relay INA, as will be described later.

7.3 The preferred lamp indicating relay $Li$ (FIGURE 13, B7) is operated by the OK relay, item 7.1(3), and when relay $Li1$ operates:

(1) It locks operated, through contacts $Li1/1$, and contacts $Pi3/3$ released (FIGURE 13, D14) to ground.

(2) It releases the lamp indicating relay $Li2$ in the next indicating circuit 76, extinguishing the lamps in such circuit. This occurs as follows. Relay $Li2$ had two locking paths when relay $Li1$ was released. One locking path was through contacts $Li2/1$ operated and $Pi1/3$ released to ground. This path disappeared when relay $Pi1$ operated. The second locking path was through contacts $Li2/1$ operated, $Li1/1$ released, and $Pi3/3$ released to ground. This path vanishes when contacts $Li1/1$ operate.

(3) Its contacts $Li1/2$ and $Li1/3$ (FIGURE 12, D8 and C6) operate and transfer control leads 116 and 118 from the first indicating connector relays ICA1, ICB1, to the next indicating connector relays ICA2, ICB2.

(4) Similarly, its contacts $Li1/4$ (FIGURE 12, F6) operate to transfer control lead 120 from relay $Pi1$ to the next $Pi$ relay, relay $Pi2$.

(5) Its contacts $Li1/5$ (FIGURE 12, H6) operate to remove one of the locking paths for relay $Pi1$, and a second locking path vanishes when relay $Li2$ releases, thus releasing contacts $Li2/5$.

(6) It contacts $Li1/6$ (FIGURE 8, and FIGURE 13, J6) close to connect permanent battery (−48 volts) to the lamps in indicating circuit 74. This maintains lit any lamps already lit and thus locks-in the information displayed in indicating circuit 74. A lamp release key LR (FIGURE 13, D4) is provided to extinguish all lit lamps if desired.

(7) Finally, its contacts $Li1/7$ (FIGURE 13, E8) operate to remove one of the locking paths for the OK relay, see item 7.1 (1). Relay OK, however, remains operated due to its one remaining locking path through contacts OK/1, $Li2/7$, operated, and $Pi1/3$ operated to ground.

7.4 When the $Li$ relay of the next indicating circuit, here relay $Li2$, releases (if operated):

(1) Its contacts $Li2/5$ (FIGURE 12, H9) release to remove one of the locking paths through contact $Pi1/1a$ for relay $Pi1$ (which, however, remains operated through contacts CC1/6 and MRA1/1) as mentioned.

(2) It contacts $Li2/7$ (FIGURE 13, E10) release and remove the one remaining locking path for the OK relay, which hence releases.

(3) It contact $Li2/6$ (FIGURE 13, J10) releases to extinguish the lit lamps in indicating circuit 76, as mentioned.

(4) It contacts $Li2/2$ and $Li2/3$ (FIGURE 12, D11 and C9) release and prepare the operate paths for indicator connector relays ICA2, ICB2, and its contacts $Li2/4$ (FIGURE 12, F9) release and prepare the operate path for relay $Pi2$.

7.5 When the OK relay releases (item 7.4(2)):

(1) Its contact OK/3 (FIGURE 13, E4) opens to open the operate path for the $Li$ relays. However, any operated $Li$ relays remain operated, due to their locking paths, see items 7.3(1) and 1.3(2).

(2) Its contact OK/6 (FIGURE 14, E9) opens and removes one of the relay RL locking paths.

(3) Its contact OK/5 (FIGURE 14, I12) opens and removes one of the operate paths for release check relay RCK.

7.6 At this time, the completing marker 30 completes its functions and releases (see the sequence chart, FIGURE 9 at point N8), and it contact MKR1/1 FIGURE 10, J6 opens to remove ground from start lead ST1. This causes relay CC1 to release, and when relay CC1 releases:

(1) Its contact MRA1/6 (FIGURE 14, F9) opens to release auxiliary malicious call relay MRA1.

(2) Its contact CC1/6 (FIGURE 12, G3) opens to release relay $Pi1$.

(3) Its contacts CC1/2 (FIGURE 10, E6) release, thus providing a locking ground again for relay MCA1 (through contact MCA1/40) when relay MCA1 reoperates.

(4) Its contact CC1/7 (FIGURE 14, G9) completes an operate path for alarm relay ALM (FIGURE 14, F14). However, relay ALM is slow operate and will not function if relay MRA1 (or relay BY1, if operated, as will be discussed) releases promptly.

7.7 When relay MRA1 releases (item 7.6(1)):

(1) Its contact MRA/6 (FIGURE 14, F9) opens the operate path for the ALM relay.

(2) Its contact MRA1/5 (FIGURE 14, E11) opens the last locking path for the RL relay, releasing the RL relay.

7.8 Relay RL, when released, releases the OKL relay (contact RL/11 at FIGURE 13, H3) and also prepares the operate paths for the marker and indicator connector relays and control relays, in an operation reversed from that discussed in item 4.9

The circuit is now returned to normal condition and is ready to register another malicious call. The next malicious call. The next malicious call will be registered in the next indicating circuit 76, from which the information was just erased.

If, instead of lamp bank indicating circuits, a print-out indicating device were used, then the operation of the OK relay would cause such a device to print an indication showing that the call was completed, or would prevent printing of an indication that the call was not completed, whichever were desired.

(8) Detection of another malicious call while a previous malicious call is being registered If another malicious call is detected, e.g. in marker 32, while a previous malicious call from marker 30 is being registered, the operation of the line detector circuit is as follows:

8.1 Relay RL is operated because of the test of marker 30. Thus (1) Contacts RL/3 and RL/4 (FIGURE 12, D4 and C4) are open and prevent operation of any of the indicating connector relays, such as relays ICA2, ICB2.

(2) Contact RL/2 (FIGURE 11, B4) is open and prevents relay M operation from operating any malicious call recording relay, e.g. relay MR2.

(3) This in turn prevents operation of the calling number part of the marker connector 40, i.e. relays MCB2, and MCC2 (since contacts MR1/7 and MR1/8, FIGURE 11, D7 and D8 are open, and also since contact RL/5, FIGURE 11, E4 is open).

8.2 The operation of relays M, MA, MCK, and CC2 is the same as described before, as if no previous malicious call were being registered at this time.

However, instead of malicious call recording relay MR1 operating, busy relay BY2 (FIGURE 10, F11) operates, due to operation of contact RL/12 at FIGURE 10, C4, see item 4.9(6). The operate path for relay BY2 is through contacts M/1, RL/12, MCA2/44, and MRA2/8.

When relay BY2 operates:

(1) It locks operated, through contacts CC2/5 and BY2/1 (FIGURE 10, E11) to ground.

(2) Contact BY2/2 (see FIGURE 14, G8, where only contact BY1/2 is shown; contact BY2/2 is multipled to the alarm relay ALM in an identical circuit to that shown for contact BY1/2) closes to complete, for a short interval an operate path for the alarm relay ALM, as will be described.

(3) Contact BY2/3 (FIGURE 10, A9) closes to operate malicious call check MCK, a task that would have been performed by contact MRA2/7 (FIGURE 10, A9) had the circuit not been busy registering a previous call; see items 4.4(7) and 4.5.

(4) Contact BY2/4 (FIGURE 10, I9) closes to ground a lead Bm2 to the completing marker 32. (Lead Bm2 is one of the control leads 84 between the markers and the control circuit.) Ground on lead Bm2 operates a busy relay B2 in marker 32, which then in a conventional manner causes its associated register to return busy or overflow tone to the calling subscriber. The marker 32 now releases, removing ground from start lead ST2, thus releasing relay CC2, which in turn releases relay BY2 (due to opening of contacts CC2/5 at FIGURE 10, E11).

In this way, the second malicious call is not allowed to be completed at a time when information as to this call cannot be registered.

*Incoming calls from another office.*—On incoming calls from another office, the operation, detection, and registration (if malicious) of a call is the same as that described for intra-office and outgoing calls, except that the indicating circuit must register the location of the incoming trunk on the trunk link frame, instead of registering the line location of the calling subscriber. Once the trunk location is known, it can be determined from the crossbar office records from which office the call originated.

Assume that first marker 30 is handling an incoming call which is being tested. Then the INC lead of leads 46 (FIGURES 3, 4, 6, 7) is grounded and this operates incoming call relay IN (FIGURE 11, D2). This is shown in the sequence chart, FIGURE 9, at point C2.

9.1 If the call is normal, i.e. not malicious, the operation of the circuit is the same as for intra-office and outgoing calls, except that the IN relay is also operated. The IN relay releases when the marker connector MCA1 releases to disconnect the completing marker 30 INC lead from the information leads 46 and hence from the cross connection field 48.

9.2 If the call is malicious, the IN relay operates as mentioned, and the operation of the circuit is the same as for intra-office or outgoing calls up to the point where malicious call recording relay MR1 operates (see the sequence chart, FIGURE 9 at point D8). When relay MR1 operates:

(1) Its contact MR1/7 (FIGURE 11, D7) does not operate relay MCB1, as described in item 4.3(7) because contacts IN/1 (FIGURE 11, E5) have now operated. Instead contact MR1/8 (FIGURE 11, D8) operates relay MCC1. The operate path for relay MCC1 is through contacts MR1/8, IN/1, RL/5, and ALM/4 to ground.

(2) Its contact MR1/8 also prepares the operate path for a relay LD1 (FIGURE 11, A6) in the trunk link frame, here assumed to be trunk link frame 62 from which the incoming call enters the office. The control lead Ld1 from the trunk link frame relay LD1 to the control circuit is one of the control leads 86 shown in FIGURE 3.

(3) Its contact MR1/9 (FIGURE 11, E8) operates incoming call auxiliary relay INA (FIGURE 11, G4) over an operate path consisting of contacts ALM/6, RL/9, MR1/9, IN/1, RL/5, and ALM/4 to ground.

Other functions of relay MR1 are as discussed in item 4.3.

9.3 When connector relay MCC1 operates (due to operation of relays IN and MR1 as just described):

(1) It locks operated through contacts (all shown FIGURE 11) MCC1/10, INA/3, ALM/5, OK/7, MRA1/9, and LCK1/1 to ground. Contact LCK1/1 is a contact of a relay LCK1 (not shown) in completing marker 30. The function of contact LCK1/1 will be explained shortly.

(2) Its contact MCC1/11 (FIGURE 14, C4) partly prepares the operate path for relay RL.

(3) Its contact MCC1/12 (FIGURE 14, D4) provides an additional locking path for relay RL.

(4) Finally, contacts MCC1/1 to MCC1/8 (FIGURE 7) connect the M and N leads (carrying information as to the trunk link frame number) from the first completing marker 30 to the indicating connectors.

9.4 When the incoming call auxiliary relay INA (FIGURE 11, G3) operates (see item 9.2(3) above):

(1) It locks operated, through contacts INA/1 and INCD/2, FIGURE 11, G2 and H2. It also locks operated through contacts INA/1, OKL/4, and MRA1/10.

(2) Its contact INA/2 (FIGURE 11, I3) closes to prepare the operate path for incoming call lamp display relay INCD.

(3) Its contact INA/3 (FIGURE 11, D15) closes to prepare a locking path for the MCC relays, as will be described shortly.

(4) Its contacts INA/4 (FIGURE 14, C6) operate to transfer the operate path of the RL relay through contacts of the MCC relays instead of through contacts of the MCB relays, and its contact INA/5 (FIGURE 14, E8) provides an additional locking path for relay RL.

(5) Its contact INA/6 (FIGURE 13, F3) prepares a locking path for the OK relay.

(6) Its contact INA/7 (FIGURE 12, C2) prepares a locking path for the ICB relays (and for the ICA relays until release relay RL operates to open contacts RL/3 and RL/4 at FIGURE 12, C3).

9.5 At the time when information as to the called number and calling trunk link frame number (of trunk link frame 62, here) is registered in the indicating circuit 74, and the RL relay operates and begins releasing the connections, the information concerning the incoming trunk location on that truk link frame, may not yet be received, due to the sequence of operations of the completing marker 30. For example, the marker may not yet have operated an appropriate trunk link connector (not shown) to close a trunk link connector contact (e.g. contact TLC/1, FIGURE 11, A8) to operate the trunk link LD relay, here assumed to be relay LD1, to close contacts LD1/1 to LD1/18 (FIGURE 7) to transmit information as to the trunk location to the indicating circuit 74.

Therefore, when the connections are being released by the control circuit, control and information paths are retained from the control circuit and from the lamps of indicating circuit 74 to the marker 30 and to trunk link frames by relay MCC1 and ICB1 respectively, which are kept locked operated.

Relay MCC1 is kept locked operated, as mentioned, item 9.3(1), through contacts (see FIGURE 11) MCC1/10, INA/3, ALM/5, OK/7, MRA1/9, and LCK1/1. Relay LCK1, which is a standard relay (not shown) in completing marker 30, will operate after the marker has received the calling trunk location from the trunk link frame and its contact LCK1/1 will then open and remove the locking path just described.

Relay ICBI (FIGURE 12, B6) is kept locked operated through contacts L$i$1/3 released, INA/7 operated, and OK/4 released, to ground. The continued operation of relays ICB1 and MCC1 does not interfere with the ability of the circuit to check other markers for malicious calls while a decision is being made whether to lock in or erase the information temporarily registered from the first malicious call.

9.6 Eventually the completing marker 30 will reach that stage of its function at which it operates the trunk link connector contact TLC/1 (FIGURE 11, A8) and a ground is extended through this contact to operate relay LD1 in the trunk link frame G2. When relay LD1 operates:

(1) Its contacts LD/1 to LD1/18 (FIGURE 7) transmit information regarding incoming trunk location on the trunk link frame over the O, P leads and through indicating connector ICB1 to the lamps of indicating circuit 74.

(2) Its contact LD1/20 (FIGURE 14, F2) provides an additional locking path for the RL relay.

(3) Its contact LD1/21 (FIGURE 11, I0) closes to operate the incoming call display INCD (as shown in the sequence chart, FIGURE 9, at point J2).

9.7 When relay INCD (FIGURE 11, I4) operates:

(1) It locks operated through contacts INA/2 and INCD/1 (FIGURE 11, I2).

(2) Its contact INCD/2 (FIGURE 11, H2) opens to prepare the release of relay INA (which however remains operated over its locking path through contacts INA/1, OKL/4, and MRA1/10).

(3) Its contact INCD/3 (FIGURE 14, E7) provides an additional locking path for relay RL.

(4) Its contacts INCD/4 and INCD/5 (FIGURE 7, and FIGURE 11, J3) close to ground leads INC0 and INC1, thus to light the two indicating lamps INC (FIGURE 2) to provide an indication that the call being registered is an incoming call. As mentioned, when the two INC lamps (also designated as L3, L4) are lit, the call is incoming and the M, N, O, P groupings are to be read instead of the G, H, I, J, K, L groupings in the lamp display 26 of FIGURE 2.

9.8 Receipt of the information from trunk link frame 62 by marker 30 operates a standard relay ICK1 (not shown) in the marker 30 in a conventional manner, thus opening contact LCK1/1 (FIGURE 11, J7). This opens the locking path for relay MCC1, releasing this relay, and also opens the operate path for relay LD1, releasing this relay as well. Operation of relays MCC1 and LD1 is no longer needed since information as to incoming trunk location on the trunk link frame 62 has now been passed into indicating circuit 74.

Indicating connector relay ICB1 remains operated at this time, but it will be released as soon as the OK relay operates (to operate contacts OK/4 at FIGURE 12, C1) or as soon as relay INA releases (to open contact INA/7 at FIGURE 12, C2).

It may happen that several markers have been tested before marker 30, and by the time marker 30 is tested, its relay LCK1 (and hence contact LCK1/1 at FIGURE 11, J7) may already have operated and released—before relay MCC1 has operated and locked operated through contact LCK1/1. If this occurs, relay MCC1 will release when the OK relay operates to open contact OK/7 (FIGURE 11, F15) or, if the call is not completed, when relay INA releases to open contact INA/3 (FIGURE 11, E15).

9.9 The remainder of the operation is similar to that previously described. If the called number is not busy and relay OK (FIGURE 13, G6) operates, relay OKL (FIGURE 13, H6) operates as before and contact OKL/4 (FIGURE 11, H3) releases relay INA (since, as may be seen from the sequence chart, FIGURE 9, relays INCD and RL are operated at this time, to open contacts INCD/2 and RL/9). When relay INA releases, its contact INA/2 (FIGURE 11, I3) releases relay INCD, and its contact INA/7 (FIGURE 12, C2) opens further the operate path of relay ICB1, which relay was released when relay OK operated.

If the marker 30 cannot complete the connections to the called number, then relays OK and OKL do not operate and other means are used to release relays INA and INCD. More specifically, when relay MRA1 releases (sequence chart, FIGURE 9, at point O13) its contact MRA1/10 at FIGURE 11, H7 opens to release relay INA, which then releases relay INCD as before.

9.10 It may be noted that if trunk link frame relay LD1 should fail to operate due to trouble, relay INCD would fail to operate (since it is operated by contact LD1/21, FIGURE 11, I0). This would keep contact INCD/2 (FIGURE 11, H2) closed to maintain relay INA operated, and contact INA/6 (FIGURE 13, F3) would maintain relay OK operated. If relay OK is operated for a long time, its contact OK/5 (FIGURE 14, I12) wil operate release check relay RCK to indicate an alarm condition, as will be described.

(10) Alarm Circuits

The alarm circuits check the overall operation of the line detector circuit. If trouble is detected, the alarm circuits disconnect the line detector circuit from the completing markers, indicate in some cases the type of trouble detected, and send an alarm to the crossbar office. The following types of trouble are detected.

10.1 Shorted Detector Card Diode

Each of the detector cards is provided with a conductor TB, to the control circuit. These conductors are shown in FIGURE 5. If any one of the diodes in the detector cards is shorted and information is transmitted to this diode, ground is transmitted through the shorted diode to the TB lead and hence to the diode check relay DCK (FIGURE 14, H4). The DCK relay is terminated to a voltage divider consisting of resistors R30 and R31 which provide enough current to operate relay DCK when lead TB is grounded, without affecting the operation of the detector cards.

10.2 When relay DCK is operated:

(1) Its contact DCK/1 (FIGURE 14, I2) closes to light diode check lamp DCKL, thus providing a visual indication that one of the diodes has shorted. Once lit, lamp DCKL will remain lit, even after relay DCK releases, until an alarm release key AR (not shown) is pressed to open contact AR/1 (FIGURE 14, J1).

(2) Its contact DCK/2 (FIGURE 14, H13) opens the operate path of the RCK relay. This is done so that release check relay RCK will not operate and provide a false indication that some other relay has failed to release.

(3) Its contact DCK/3 (FIGURE 10, H2) provides an additional locking ground for relay MCA1. This is done, because, were relay MCA1 to release at this time, before an alarm has been sent out, the ground through the shorted diode would be removed; diode check relay DCK would release, and no alarm signal would be sent out. Therefore, it is necessary to keep relay MCA1 operated to keep relay DCK operated until an alarm has been sent out.

(4) Contact DCK/4 at FIGURE 14, F10 operates the slow operate alarm relay ALM.

10.3 When the alarm relay ALM is operated:
   (1) It locks operated through its contact ALM/1 and alarm release key contact AR/2, at FIGURE 14, G14. Manual depression of key AR is now necessary in order to release the alarm relay.
   (2) Contacts ALM/2 (FIGURE 10, F4) operate to release all marker connector MCA relays whose CC relays have not yet operated. Operation of contacts ALM/2 also provides an additional locking path for marker lockout relay ML, to ensure that no marker connector MCA relays will operate later.
   (3) Contact ALM/3 (FIGURE 10, G4) opens and releases any operated marker connector MCA relays whose CC relays have operated, e.g. relay MCA1. (If relay MCB1 is operated and contact MCB1/140 at FIGURE 10, D5 is closed at this time, relay MCA1 will release when relay MCB1 releases as described in item (5) below.)
   (4) Contact ALM/3a (FIGURE 10, G4) opens the locking path for the BY relays, releasing any locked-operated busy relays.
   (5) Contacts ALM/4 (FIGURE 11, E3) operate to release the MCB relays and to open the operate paths of the MCC relays, as well as to light lamp ALML (FIGURE 11, E2), thus providing a visual indication that the alarm relay has operated. Contact ALM/5 (FIGURE 11, F16) opens the locking path of the MCC relays.
   (6) Contact ALM/6 (FIGURE 11, G3) releases relay INA if operated, and contact ALM/7 (FIGURE 13, G5) releases relay OK if operated.
   (7) Contact ALM/8 (FIGURE 14, G14) closes to send a major alarm over lead MJ to miscellaneous circuits (not shown) in the crossbar office.

*Failure of operation of release relay RL*

10.4 If release relay RL (FIGURE 14, B15) fails to operate due to failure of operation of a relay in the chain of relays required to operate relay RL, then contact RL/6 (FIGURE 14, H12) remains closed. If a malicious call is being processed at this time, relay MA (FIGURE 10, D0) will be operated to close contact MA/6 (FIGURE 14, H11), thus operating release check relay RCK. When release check relay RCK operates:
   (1) Its contact RCK/1 at FIGURE 14, J14, closes to light lamp RCKL, which will now remain lit (until key AR is operated) to provide a visual indication that relay RCK has operated.
   (2) Its contact RCK/2 (FIGURE 14, G11) closes to operate the alarm relay ALM.

The alarm relay in operating performs the same functions as before, including release of any operated marker connector relays, such as relays MCA1, and MCB1 or MCC1. This releases relay MA, see item 4.10(3), and contact MA/6 (FIGURE 14, H11) opens to release relay RCK. Lamp RCKL remains lit, as mentioned.

10.5 Among the situations that could cause relay RL to fail to operate is operation of none or more than one P$i$ relay, in registering a malicious call. Assume for example that no P$i$ relay operates. Then, as shown in FIGURE 14, ground from contacts MRA1/4 operated, MRA2/4a released, and MRA3/4a released is extended through contacts P$i$1/5, P$i$2/5 and P$i$3/5, all released, to the alarm relay ALM. No ground can reach the RL relay, which thus cannot operate. As may be seen, in such case, relay ALM is promptly actuated.

Similarly, if relays P$i$1 and P$i$2 should both operate at the same time, ground from the MRA relays is extended through contacts P$i$1/5 operated, and P$i$2/5a operated, and again reaches the alarm relay, rather than relay RL. Since relay RL does not operate, relay RCK operates.

In the same way if none or more than one MRA relay operates, relay RL will fail to operate and the alarm relay (and also relay RCK) will operate instead.

10.6 The release check relay RCK also operates if trouble occurs in the operation of the L$i$ or INA relays.
   (1) It will be recalled that operation of relay L$i$1 (FIGURE 13, B7) opened the locking paths for relay L$i$2 and released the same; see item 7.3(2). When relay L$i$2 released, its contacts L$i$2/7 (FIGURE 13, E10), released the OK relay. If relay L$i$2 fails to release, relay OK remains operated, and contact OK/5 (FIGURE 14, I12) operates relay RCK.
   (2) If incoming call auxiliary relay INA fails to release, then contact INA/6 (FIGURE 13, F3) maintains the OK relay operated, and again, contact OK/5 (FIGURE 14, I12) operates relay RCK. As mentioned, one circumstance causing relay INA to fail to release would be failure of relay INCD to operate, due for example to failure of a trunk link frame LD relay to operate; see item 9.10.

*Other alarm situations*

10.7 When a CC relay releases, after release of its associated completing marker, its associated control relay MRA should also release (see sequence chart, FIGURE 9, at point 69, for example). If this fails to occur, then contact MRA1/6 (FIGURE 14, G9) for example, will remain closed and relay ALM will operate.

10.8 Similarly, if a BY relay e.g. relay BY1, has operated instead of an MRA relay (this occurs if a second malicious call is detected while a first malicious call is still being registered), such BY relay should release after its associated CC relay releases (sequence chart FIGURE 9, at point M17). If this fails to occur, contact BY1/2 (FIGURE 14, G8), for example, remains closed and operates relay ALM.

10.9 If a CC relay, e.g. relay CC1, fails to operate, then the alarm relay is energized, and also, call checked relay CCK releases, to light call checked lamp CCKL (FIGURE 14, I8) as follows.

Normally, relay CCK (FIGURE 10, A0) is operated. When relay CC1 operates, through a ground extending, e.g. through contacts MCK/1 released, ML/4 operated and MCA1/42, 43 operated, this same ground is momentarily extended through contacts CC1/1 released (FIGURE 10, B6) to shunt down relay CCK, see item 1.2(2). Relay CCK is slow release and will release only if relay CC1 fails to operate promptly. If relay CCK releases, its contact CCK/1 (FIGURE 14, F8) closes to energize relay ALM and light lamp CCKL. It will be noted that for release of relay CCK to achieve these functions, relay ML must be operated so that contact ML/6 (FIGURE 14, F7) will be closed. This is because, when power is initially turned on for the line detector circuit, relay CCK is released for a short time and would operate relay ALM before it could itself operate, except for provision of contact ML/6 as mentioned.

10.10 Relay CCK will also operate if a false ground appears on the locking path for the MCA relays. This locking path is discussed (for relay MCA1) at items 4.2(4) and 4.3(3). If ground remains on this locking path for too long, it shunts down relay CCK through a diode D50 at FIGURE 10, B3.

In addition, if an indicator connector ICA relay such as relay ICA1 fails to release, its contact ICA1/42 (FIGURE 10, I2) shunts down relay CCK through diode D50, thus lighting lamp CCKL.

*Modifications.*—As will be appreciated, various modifications may be made in the exemplary circuit just described. For example and as shown in FIGURE 15, a printout device 200 may be used and the marker connector calling number parts eliminated, with indicating connectors 202, 204, 206 connected directly to the markers. Which indicating connector is actuated will be controlled by the same relays that formerly actuated an appropriate marker connector calling number part relay, i.e. by release relay RL and by the malicious call recording (MR) relays, such as relay MR1. The control circuit 44 will include a contact OK/8 of the OK relay, which contact will close if the marker under test can complete connections to the called number and will ground a control lead 208 to the printout device 200, thus causing the printout device to print an indication that the call was completed.

In addition, instead of having the marker connector called number parts connected in series through each other to the cross-connection field 48, each can be individually connected to the cross-connection field 48. The sequence of operation of the marker connector called number parts, now shown as relays MCA1', MCA2', MCA3', FIGURE 16, will be controlled by a preference circuit 210 (FIGURE 16) in the control circuit 44. The construction of such an arrangement will, in view of the foregoing description, be readily apparent to those skilled in the art, but a typical approach is illustrated in FIGURE 17, where preference relays PR1, PR2, PR3 are connected through marker lockout (ML) relay contacts ML/1', ML/2', ML/3' respectively, to respective marker start leads ST1, ST2, ST3. Operation of one or more markers operates the associated preference relays, e.g. relay PR1, which locks operated under control of the control circuit (being released, e.g. by operation of release relay RL) and relay ML operates to lock out from operation any further PR relays. The call check (CC) relays may also have contacts, e.g. contacts CC1/2', CC2/2', CC3/2', in the operate paths of the PR relays, to prevent the operation twice of a PR relay while its associated marker is processing the same call.

The preference relays have contacts PR1/1, PR2/1, PR3/1, which operate, in sequence, auxiliary relays PRA1, PRA2, PRA3. Firstly, relay PRA1 operates and its contact PRA1/1 operates marker connector relay MCA1', which then locks operated under control of the control circuit. When the testing of the first marker has been accomplished, relays PR1, PRA1, MCA1' release and relay PRA2 is operated to operate the second marker connector relay MCA2, for test of the second marker.

As another alternative, each line to be cross-connected for malicious call detection may be associated with one indicating unit. Since each indicating unit is specifically associated with a particular called line, it need not display the called number and thus can be smaller than an indicating unit which displays both called number and calling number equipment location.

The construction of such an arrangement will in general be similar to the arrangement shown in FIGURES 1 to 14 except for the actuation of the indicating connectors and indicating circuits, which will now be selected by the particular called number detector that has operated. This differs from the FIGURES 1 to 14 arrangement, where the selection of an indicating connector and indicating circuit for operation depends upon which indicating connector and circuit have last operated.

Consider FIGURE 18, where pertinent portions of a line detector circuit are shown. The line detector circuit of FIG. 18 has, as shown, just three called number detectors 300, 302, 304 (each made up, as appropriate, of an office code card and directory number card). Line detector circuit 4" will thus detect and record calls to any of three preselected numbers.

To each detector 300, 302, 304 is connected a respective detector relay D1, D2, D3, which operates when the detector operates. The detector relays control the selection of the indicating connection and indicating circuit that are to operate. For example, if detector 300 and relay D1 operate, then indicating connector and circuit 306 and 308 will operate; if detector 302 and relay D2 operate, then indicating connector and circuit 310 and 312 will operate, and if detector 304 and relay D3 operate, then indicating connector and circuit 314 and 316 will operate.

The operation of the indicating connectors is controlled partly by the same relays that control the operation of the marker connector calling number parts (the MR and RL relays) and partly by the D relays. The indicating connector relays are shown diagrammatically in FIGURE 18 as relays ICA1", ICA2", and ICA3", their operate paths being prepared (in control circuit 44') by operation of any of the MR relays with the RL relay released. Operation of one of the D relays, e.g. relay D1, completes the operate path for the indicating connector relay, e.g. relay ICA1", associated with the operated D relay. In this way, an indicating connector will operate only if (a) a detector output occurs and (b) the line detector circuit is not busy registering a previous malicious call, and (c) the indicating connector in question is the indicating connector associated with the particular detector and D relay that operated.

The indicating circuits 308, 312, 316 are operated in a manner similar to that for the FIGURES 1 to 14 arrangement, i.e. a P*i* relay connects temporary holding battery to the indicating circuit lamps until the marker that caused the detector output releases, and an L*i* relay connects permanent holding battery to the lamps provided the OK relay operates indicating that a connection to the called number can be completed. However, the selection of which P*i* and L*i* relays operate is now made by the D relays instead of by the P*i* and L*i* relays last operated. The details of the circuitry ore not illustrated, since they will be readily apparent to a person skilled in the art in view of the foregoing description. It should however be observed that the P*i* relays may now be operated in the same way as the indicating connector relays shown in FIGURE 18, i.e. the particular P*i* relay to be operated will depend on which D relay is operated. The P*i* relay may lock operated, through contacts of the CC and MRA relays, as in the FIGURES 1 to 14 embodiments, and the operation of a P*i* relay will prepare the operate path for its associated L*i* relay, such L*i* relay operating provided that the OK relay operates. After information of the calling number has been registered temporarily in the appropriate indicating circuit, relay RL releases the connections in the usual manner to permit test of the next operated marker.

It will be necessary to provide for erasure of a display in an indicating circuit before a further display can be registered therein. This can be accomplished by any suitable means, such as providing contacts of each D relay in the locking path of the L*i* relay for the indicating circuit associated with such D relay. Thus, as soon as a detector and D relay operate, the lamp display in the indicating circuit associated with such operated detector will be extinguished. The detector and D relay release before the L*i* relay re-operates and will not affect its locking path at this time.

It may be desired not to erase a display in an indicating circuit upon occurrence of a call to the line associated with that indicating circuit, until it is determined whether the call can be completed. In that case, sutable buffer storage means (e.g. relay storage means) shown in dotted lines at 318 in FIGURE 18, may be provided to receive and temporarily store calling line information. Upon operation of the OK relay, an appropriate indicating connector will be actuated to direct the information in storage unit 318 to an appropriate indicating circuit.

Since the detector and D relay causing the temporary recording in storage circuit 318 will have released by the time the OK relay operates, the selection of which indicating connector to operate may be effected by an auxiliary D relay (not shown) which operates upon operation of its associated D relay and any MR relay (like the ICA" relays) and releases (like the Pi relays) when the marker under test releases.

We claim:

1. For use with a common control telephone system including a completing marker operative to process a call from a calling line to a called number, a device for recording a call being processed to a preselected called number, said device comprising
   (a) detector means for providing a detector output upon receipt by said detector means of said preselected called number,
   (b) means for connecting said detector means to said marker upon seizure of said marker, for said detector means to receive a called number being processed by said marker prior to completion of the call being processed by said marker,
   (c) means for receiving, indicating and recording information of a called number and of the calling line calling such called number,
   (d) connector means for coupling said indicating means to said marker to transmit said information to said indicating means upon operation of said connector means,
   (e) and a control circuit coupled to said detector means and to said connector means, said control circuit including actuating means responsive to said detector output for thereupon operating said connector means during the processing of said call by said marker while leaving said marker free to continue such processing, thus to effect a recording in said indicating means of said preselected called number and the calling line calling said preselected called number during the continued processing of said call by such completing marker.

2. A device according to claim 1 wherein
   (f) said control circuit includes paths busy means for connection to said completing marker and operative upon occurrence of said detector output for receiving information of whether said marker can complete the call being processed thereby and for providing one output in the event that said marker cannot complete said call, and a different output in the event that said marker can complete said call.
   (g) and said means for receiving, indicating and recording includes means coupled to said paths busy means for distinguishing between the outputs therefrom to provide an indication in said recording of whether said call was completed.

3. In a common control telephone system including a plurality of completing markers for processing calls from a calling line to a called number, a device for testing said markers for the presence of calls being processed to any of a plurality of preselected called numbers and means for recording said calls, said device comprising
   (a) detector means including an input, and a plurality of called number detectors connected to said input, said detector means providing a detector output upon receipt of any of said preselected called numbers at said input,
   (b) a plurality of marker connectors, one connected to each marker, said marker connectors being operable to connect said markers one at a time to said input of said detector means to transmit to said input the called number being processed by the marker so connected to said input,
   (c) means for receiving, indicating and thereupon recording information of a called number and of a calling line calling such called number,
   (d) connector means coupling said markers with said means for receiving, indicating and recording and operable to transmit said information from any selected one of said markers to said means for receiving, indicating and recording,
   (e) and a control circuit coupled to said detector means, to said marker connectors, and to said connector means (d), said control circuit including
      (i) marker connector control means responsive to seizure of said markers for operating the marker connectors connected to the operating markers to connect said operating markers, one at a time and in sequence, to said input within the interval of one marker operation, thus to test the markers for calls being processed by said operating markers,
      (ii) actuating means responsive to a detector output, such output indicating that the marker under test at the time of such output is processing a call to one of said preselected numbers, for thereupon operating said connector means (d), during the continued processing of the call by said marker under test while leaving such marker free to continue its operation, to couple said marker under test to said means for receiving, indicating and recording thus to effect a recording of said information from said marker under test,
      (iii) and release means operative upon recording in said means for receiving, indicating and recording of said information from said marker under test, for releasing the marker connector connected to said marker under test to permit connection of a further operating marker to said input of said detector means, for testing of said further operating marker.

4. A device according to claim 3 wherein said control circuit includes means responsive to seizure of said operating markers for locking out from operation the marker connectors of any further markers operating subsequently to seizure of said operating markers until after test of all of said operating markers, thus to prevent such subsequent operation of a marker from interfering with the testing of said operating markers.

5. A device according to claim 4 wherein
   (f) said control circuit includes paths busy means coupled to said markers for receiving, after recording of said information from said marker under test, information from said marker under test of whether such marker can complete the call being processed thereby and for providing one output in the event that such call cannot be completed and a different output in the event that such call can be completed,
   (g) and said indicating means includes means coupled to said paths busy means for distinguishing between the two outputs thereof and for providing an indication in said recording of whether the call recorded was completed.

6. A device according to claim 5 wherein each said marker includes busy signal receiving means, receipt of a signal thereat causing the marker to effect the return of busy or overflow tone to a calling subscriber associated with the calling line being processed by the marker and then to release, and wherein said control circuit includes
   (iv) switching means operative in the interval between the time of recording of said information from said marker under test and the time that said means (g) provides an indication in said recording of whether the call recorded was completed, operation of said switching means providing an indication that said recording has not been completed,
   (v) and marker signalling means coupled to said switching means and responsive, during operated condition of said switching means, to a detector output indicating that a further operating marker is processing a call to one of said preselected numbers, for transmitting a said signal to the busy signal receiving means of said last mentioned further operating marker, whereby to prevent an unrecorded completion of a call to one of said preselected numbers.

7. A device according to claim 4 wherein said control circuit includes means responsive to the continued operation of a marker that has been tested, for preventing reoperation of the marker connector associated with such tested marker until after such tested marker has released, thus to prevent testing more than once of a marker while it is processing the same call.

8. In a common control telephone system including a plurality of completing markers for processing a call from a calling line to a called number, a device for testing said markers for the presence of calls being processed to any of a plurality of preselected called numbers and means for recording said calls, said device comprising (a) detector means including an input, and a plurality of called number detectors connected to said input, said detector means providing a detector output upon receipt of any of said preselected called numbers at said input, (b) a plurality of marker connectors each having a called number part and a calling number part, commencing with a lowest numbered marker connector and ending with a highest numbered marker connector, one marker connector being associated with each marker.

(c) the called and calling number parts of each marker connector being connected to the marker associated with such marker connector, to obtain from such marker information of a called number and calling line being processed thereby, ($c_c$) the called number of parts of said marker connectors being coupled in series, with the lowest numbered called number part connected to said input of said detector means, said called number parts being operable to connect said markers, one at a time, to said input, the marker connected to said input being that connected to the lowest numbered operated called number part, (d) a plurality of indicating circuits, each containing illuminating means for receiving and thereupon indicating information of a called number and a calling line to be connected to such called number, (e) a plurality of indicator connectors, one associated with each indicating circuit, each indicator connector having an information output connected to its associated indicating circuit and an information input connected to the information inputs of the other indicator connectors, (f) the connected together information inputs of said indicator connectors having called number information leads connected to said input of said detector means and calling line information leads connected to said calling number parts of said marker connectors, each indicator connector being operable to transmit said information of a called number and calling line received at its input to its associated indicating circuit, (g) and a control circuit connected to said markers, to said marker connectors, to said indicator connectors, and to said indicating circuits and including (i) means responsive to operation of said markers for operating the marker connector called number parts connected to the operated markers while leaving such operated markers free to continue their operation, thus to connect the lowest numbered operated marker to the input of said detector means for test and to said called number information leads of said indicator connectors, (ii) means responsive to operation of said marker connector called number parts for locking out from subsequent operation any further marker connector called number parts until all of the previously operated called number parts have released, thus to prevent operation of a further marker subsequent to operation of said operated markers from interfering with testing of said operated markers, (iii) means responsive to a detector output, said output indicating that said lowest numbered operated marker under test is processing a call to one of said preselected numbers, for operating the calling number part connected to said lowest numbered operated marker, to effect a recording connection of such marker to the calling line information leads of said indicator connectors while leaving such marker free to continue its operation, (iv) means including preference means connecting said indicating circuits and indicator connectors in a preference chain for operation, one indicator connector at a time, in a cyclical sequence, the recording of information in one indicating circuit operating said preference means to prepare the next indicator connector for operation, said next indicator connector then being a preferred indicator connector and its associated indicating circuit being a preferred indicating circuit, (v) means responsive to an output from said detector for operating, at the time of effecting said recording connection, the preferred indicator connector to effect a recording in the preferred indicating circuit of information of the called number and calling line being processed by said lowest numbered operated marker, (vi) and means responsive to the effecting of said recording for releasing the marker connector called and calling number parts connected to said lowest numbered operated marker before said marker completes the call that it is processing, the operated called number part connected to the next lowest numbered of said operated markers thus connecting such next lowest numbered operated marker to the input of said detector means for test, whereby to permit testing of said operated markers within the interval of one marker operation.

9. A device according to claim 8 wherein said control circuit includes (vii) paths busy means for receiving, from a marker, to which it is connected, information of whether such marker can complete a call being processed thereby, and for providing one output in the event that such call can be completed and a different output in the event that such call cannot be completed, (viii) means responsive to an output from said detector means, such detector output indicating that the marker under test is processing a call to one of said preselected numbers, for thereupon connecting said paths busy means to such marker under test, (ix) and means responsive to an output from said paths busy means indicating that the call processed by said marker under test cannot be completed, for erasing the recording of information of such call from the indicating circuit in which such recording was made.

10. A device according to claim 9 wherein said control circuit includes means responsive to the continued operation of a marker that has been tested, for preventing reoperation of the marker connector associated with such tested marker until after such tested marker has released, thus to prevent testing more than once of a marker while it is processing the same call.

11. A device according to claim 8 wherein
   (h) the connection between each marker and its associated marker connector comprises a set of leads, information from a marker being in the form of the presence of a predetermined potential on selected leads of said set,
   (i) said illuminating means of each indicating circuit comprises a plurality of lamps of a type requiring a first voltage for initial lighting and a second lower voltage for maintaining a lit condition, each lamp having a first and a second terminal,
   (j) a first potential source for supplying said first voltage with respect to said predetermined potential, and a second potential source for supplying said second voltage with respect to said first voltage,
   (k) each indicating circuit having said first terminals of its lamps connected to said first source and said second terminals connected to the information output of its associated indicator connector, whereby operation of the preferred indicator connector, when the latter is connected through an operated marker connector to a marker under test, applies said first voltage to selected lamps of its associated preferred indicating circuit, thus to display information of a called number and calling line being processed by the marker so long as such operated marker connector and the preferred indicator connector remain operated,
and wherein said control circuit includes
   (vii) means operative in response to a detector output for establishing a first temporary connection of said second source to said second terminals of the lamps of said preferred indicating circuit, thus temporarily to maintain lit those lamps already lit in said preferred indicating circuit,
   (viii) means responsive to the release of the marker under test for thereupon releasing said means (vii) to remove said first temporary connection,
   (ix) paths busy means for receiving, from a marker, to which it is connected, information of whether such marker can complete a call being processed thereby, and for providing one output in the event that such call can be completed and a different output in the event that such call cannot be completed,
   (x) means responsive to an output from said detector means, such output indicating that the marker under test is processing a call to one of said preselected numbers, for thereupon connecting said paths busy means to such marker under test,
   (xi) and means responsive to an output from said paths busy means indicating that the call processed by said marker under test can be completed, for establishing a second locking connection of said second source through resistance means to said second terminals in said preferred indicating circuit, thus to lock in the information in the lamps of the preferred indicating circuit.

12. A device according to claim 11 wherein each of said markers includes busy signal receiving means, receipt of a selected signal thereat causing the marker to effect return of busy or overflow tone to a calling subscriber associated with the calling line being processed by the marker, and wherein said control circuit includes
   (xii) switching means operative in the interval between the time of establishing said temporary connection, and the time of release of said marker under test, operation of said switching means providing an indication that recording of information from said marker under test has not yet been completed,
   (xiii) a plurality of signalling means, one associated with each marker, each operative thereupon to send a said selected signal to its associated marker,
   (xiv) and means responsive to operation simultaneously of said switching means, the marker connector called number part associated with a further operated marker under test, and a detector output indicating that said further operated marker under test is processing a call to one of said preselected numbers, for operating the signalling means associated with such further operated marker under test to send said selected signal thereto, whereby to prevent completion unrecorded of a call to one of said preselected numbers.

13. A device according to claim 12 wherein said control circuit includes means responsive to the continued operation of a marker that has been tested, for preventing reoperation of the marker connector associated with such tested marker until after such tested marker has released, thus to prevent testing more than once of a marker while it is processing the same call.

14. A device according to claim 13 wherein each detector includes a diode AND circuit including a plurality of diodes having input leads connected to said input, the presence of said selected potential on all the input leads of one of said AND circuits causing an output therefrom, and wherein said control circuit includes alarm means coupled to said diodes and operative upon passage of said selected potential through any of said diodes indicating that said diode is short circuited, said alarm means including means for releasing all operated marker connector called and calling number parts and for preventing initiation of operation of all marker connector called and calling number parts upon operation of said alarm means.

15. For use with a common control telephone system including a completing marker operative to process a call from a calling line to a called number, a device for recording a call being processed to a preselected called number, said device comprising
   (a) detector means for providing a detector output upon receipt by said detector means of said preselected called number,
   (b) means for connecting said detector means to said marker upon operation of said marker, for said detector means to receive a called number being processed by said marker prior to completion of the call being processed by said marker,
   (c) means, including means, coupled to said marker and operable to receive, indicate and record information identifying a calling line,
   (d) and a control circuit coupled to said detector means and to said means (c), said control circuit including actuating means responsive to said detector output for thereupon operating said means (c) during the processing of said call by said marker while leaving said marker free to continue such processing, thus to effect a recording in said means operable to receive, indicate and record of the calling line calling said preselected called number during the continued processing of said call by said marker.

16. In a common control telephone system including a plurality of completing markers for processing calls from a calling line to a called number, a device for testing said markers for the presence of calls being processed to any of a plurality of preselected called numbers and means for recording said calls, said device comprising
   (a) a plurality of called number detectors, one for each of said preselected called numbers, each called number detector having an input and being operable to provide a detector output upon receipt of its associated preselected called number at its input,
   (b) a plurality of marker connectors, one for each marker, each marker connector having a called number part and a calling number part, said called number parts being operable to connect said markers one at a time to the inputs of said called number detectors to transmit to said inputs the called number being processed by the marker so connected to said inputs, (c) a plurality of indicating and recording circuits for receiving, indicating and recording information of a calling line, one indicating and recording circuit being associated with each called number detector and hence with each preselected called number, (d) a plurality of indicator connectors, one for each indicating circuit, each indicator connector coupling its associated indicating circuit to all of said marker connector calling number parts, operation of an indicator connector and of a marker connector calling number part transmitting said information from the marker to which such operated marker connector calling number part is connected to the indicating and recording circuit of such operated indicator connector, (e) and a control circuit coupled to said called number detectors, to said marker connectors, and to said indicator connectors, said control circuit including (i) control means responsive to operation of said markers, for operating the marker connector called number parts connected to the operated markers to connect said operated markers, one at a time and in sequence, to the inputs of said detectors, thus to test the calls being processed by said operated markers, (ii) and actuating means responsive to an output from one of said detectors, such output indicating that the marker under test at the time of such output is processing a call to the preselected called number associated with said one detector to operate said one detector, for thereupon operating the marker connector calling number part connected to said marker under test and for operating the indicator connector associated with the operated detector, during the continued processing of the call by said marker under test while leaving such marker free to continue its operation, to couple said marker under test to the indicating circuit of such operated indicator connector, thus to effect a recording in said last mentioned indicating circuit of information identifying the calling line calling the called number associated with said one detector.

References Cited

UNITED STATES PATENTS

| | | | |
|---|---|---|---|
| 2,879,338 | 3/1959 | Joel | 179—18.61 |
| 3,385,933 | 5/1968 | Abert et al. | 179—18.61 |

WILLIAM C. COOPER, Primary Examiner